US012689840B2

(12) United States Patent
Kokado et al.

(10) Patent No.: US 12,689,840 B2
(45) Date of Patent: Jul. 21, 2026

(54) PHOTOELECTRIC CONVERSION DEVICE AND SIGNAL PROCESSING DEVICE

(71) Applicant: CANON KABUSHIKI KAISHA, Tokyo (JP)

(72) Inventors: Tomoya Kokado, Kanagawa (JP); Noriyuki Shikina, Tokyo (JP); Hiroaki Taniguchi, Tokyo (JP); Keisuke Takahashi, Tokyo (JP); Momonosuke Odani, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 79 days.

(21) Appl. No.: 18/958,195

(22) Filed: Nov. 25, 2024

(65) Prior Publication Data

US 2025/0184633 A1    Jun. 5, 2025

(30) Foreign Application Priority Data

Nov. 30, 2023    (JP) ................................. 2023-203247

(51) Int. Cl.
*H04N 25/628* (2023.01)
*H04N 25/633* (2023.01)
(Continued)

(52) U.S. Cl.
CPC ........... *H04N 25/628* (2023.01); *H04N 25/65* (2023.01); *H04N 25/772* (2023.01); *H04N 25/78* (2023.01)

(58) Field of Classification Search
CPC .... H04N 25/628; H04N 25/65; H04N 25/772; H04N 25/78; H04N 25/77; H04N 25/633; H04N 25/60; H04N 25/62
See application file for complete search history.

(56) References Cited

U.S. PATENT DOCUMENTS 7,733,391 B2 *    6/2010    Nikkanen ................. G06T 5/92
                                                              348/246
10,389,964 B2    8/2019    Taniguchi
(Continued)

FOREIGN PATENT DOCUMENTS

JP        2005-269098 A        9/2005
JP        2015-61127 A        3/2015
(Continued)

OTHER PUBLICATIONS

U.S. Appl. No. 19/068,138, filed Mar. 3, 2025 by Yoshiko Shigiya.
(Continued)

*Primary Examiner* — Marly S Camargo
(74) *Attorney, Agent, or Firm* — VENABLE LLP

(57)        ABSTRACT

A photoelectric conversion device includes a pixel array, a pixel control unit, and a correction value generation unit. The pixel array includes an effective pixel region outputting a signal according to incident light and a correction signal acquisition region outputting a correction signal for black level correction. The correction signal acquisition region is arranged corresponding to each row of the effective pixel region. The pixel control unit controls pixels of two or more rows in parallel in one row control period, and changes the number of control rows in which the pixels are controlled in parallel in one frame period. The correction value generation unit generates the correction value using a first correction coefficient in a predetermined number of row control periods including a timing at which the number of control rows changes, and generates the correction value using a second correction coefficient in other row control periods.

20 Claims, 18 Drawing Sheets

(51) Int. Cl.

| | |
|---|---|
| *H04N 25/65* | (2023.01) |
| *H04N 25/77* | (2023.01) |
| *H04N 25/772* | (2023.01) |
| *H04N 25/78* | (2023.01) |

(56) References Cited

U.S. PATENT DOCUMENTS

| | | | | |
|---|---|---|---|---|
| 10,659,713 | B2 | 5/2020 | Shikina | |
| 11,070,755 | B2 | 7/2021 | Takahashi | |
| 11,202,023 | B2 | 12/2021 | Shigiya | |
| 11,303,829 | B2 | 4/2022 | Shigiya | |
| 11,490,041 | B2 | 11/2022 | Shigiya | |
| 11,595,606 | B2 | 2/2023 | Shikina | |
| 11,627,264 | B2 | 4/2023 | Igarashi | |
| 11,700,467 | B2 | 7/2023 | Shikina | |
| 11,758,296 | B2 | 9/2023 | Shikina | |
| 12,075,171 | B2 | 8/2024 | Ashida | |
| 12,088,933 | B2 | 9/2024 | Shimada | |
| 2004/0145665 | A1* | 7/2004 | Oda | H04N 25/633 |
| | | | | 348/257 |
| 2005/0206762 | A1 | 9/2005 | Funakoshi | |
| 2017/0142359 | A1* | 5/2017 | Ikedo | H04N 25/704 |
| 2020/0314370 | A1* | 10/2020 | Takahashi | G06T 7/55 |
| 2023/0395629 | A1 | 12/2023 | Matsuyama | |
| 2024/0080590 | A1 | 3/2024 | Shimada | |
| 2024/0080591 | A1 | 3/2024 | Takahashi | |
| 2024/0080592 | A1 | 3/2024 | Masuda | |
| 2024/0111146 | A1 | 4/2024 | Matsuyama | |
| 2024/0155268 | A1 | 5/2024 | Shigiya | |
| 2024/0241230 | A1 | 7/2024 | Matsuyama | |
| 2024/0284066 | A1* | 8/2024 | Fukuhara | H04N 25/677 |
| 2024/0406587 | A1 | 12/2024 | Shimada | |

FOREIGN PATENT DOCUMENTS

| | | |
|---|---|---|
| JP | 2020-39066 A | 3/2020 |
| JP | 2020-113944 A | 7/2020 |

OTHER PUBLICATIONS

U.S. Appl. No. 19/038,854, filed Jan. 28, 2025 by Momonosuke Odani.

U.S. Appl. No. 19/0059,000, filed Feb. 20, 2025 by Taichi Kasugai.

* cited by examiner

Figure 10:
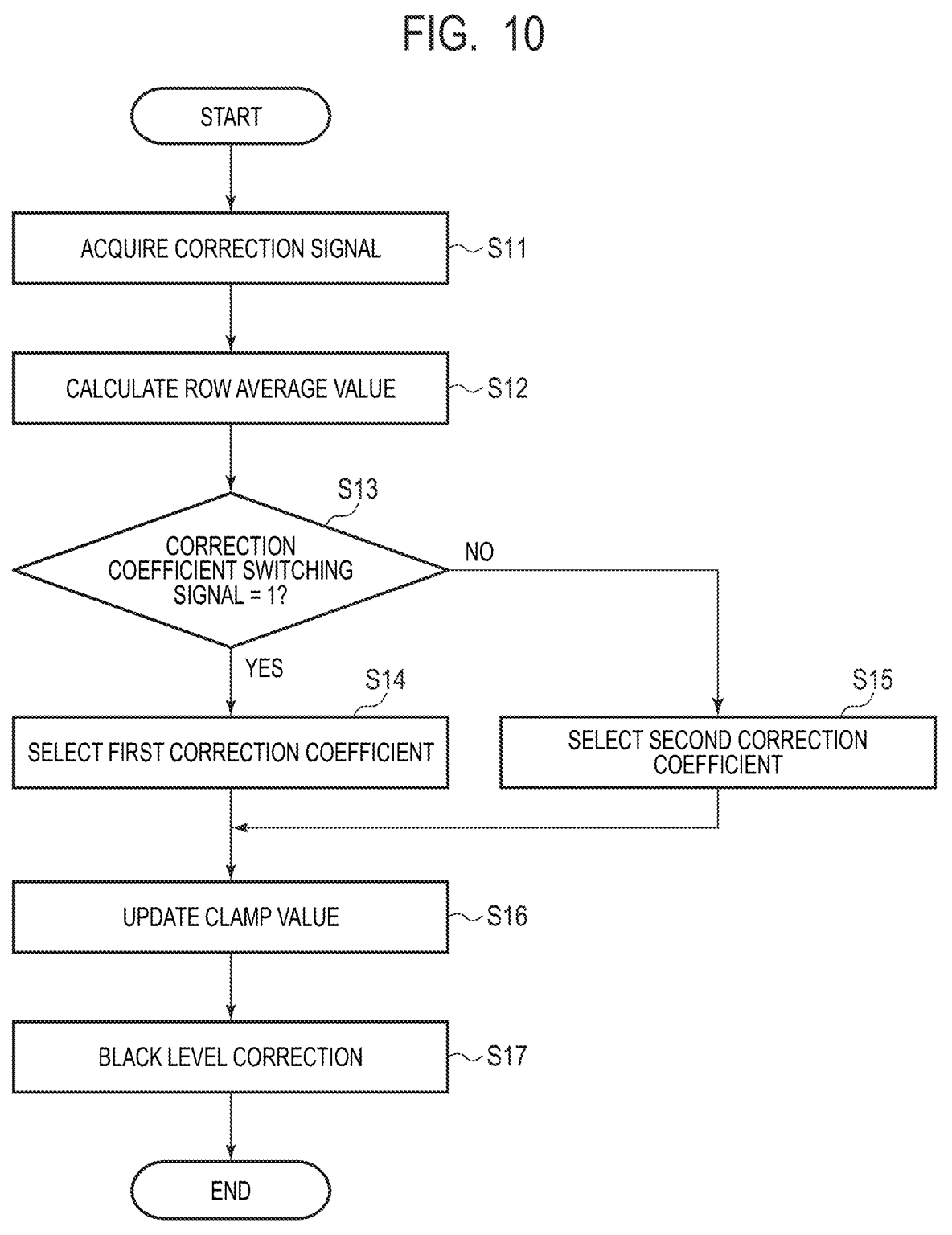

START

↓

ACQUIRE CORRECTION SIGNAL — S11

↓

CALCULATE ROW AVERAGE VALUE — S12

↓

S13

CORRECTION COEFFICIENT SWITCHING SIGNAL = 1?

— NO → SELECT SECOND CORRECTION COEFFICIENT — S15

— YES ↓

SELECT FIRST CORRECTION COEFFICIENT — S14

↓

UPDATE CLAMP VALUE — S16

↓

BLACK LEVEL CORRECTION — S17

↓

END

Figures 18A, 18B:
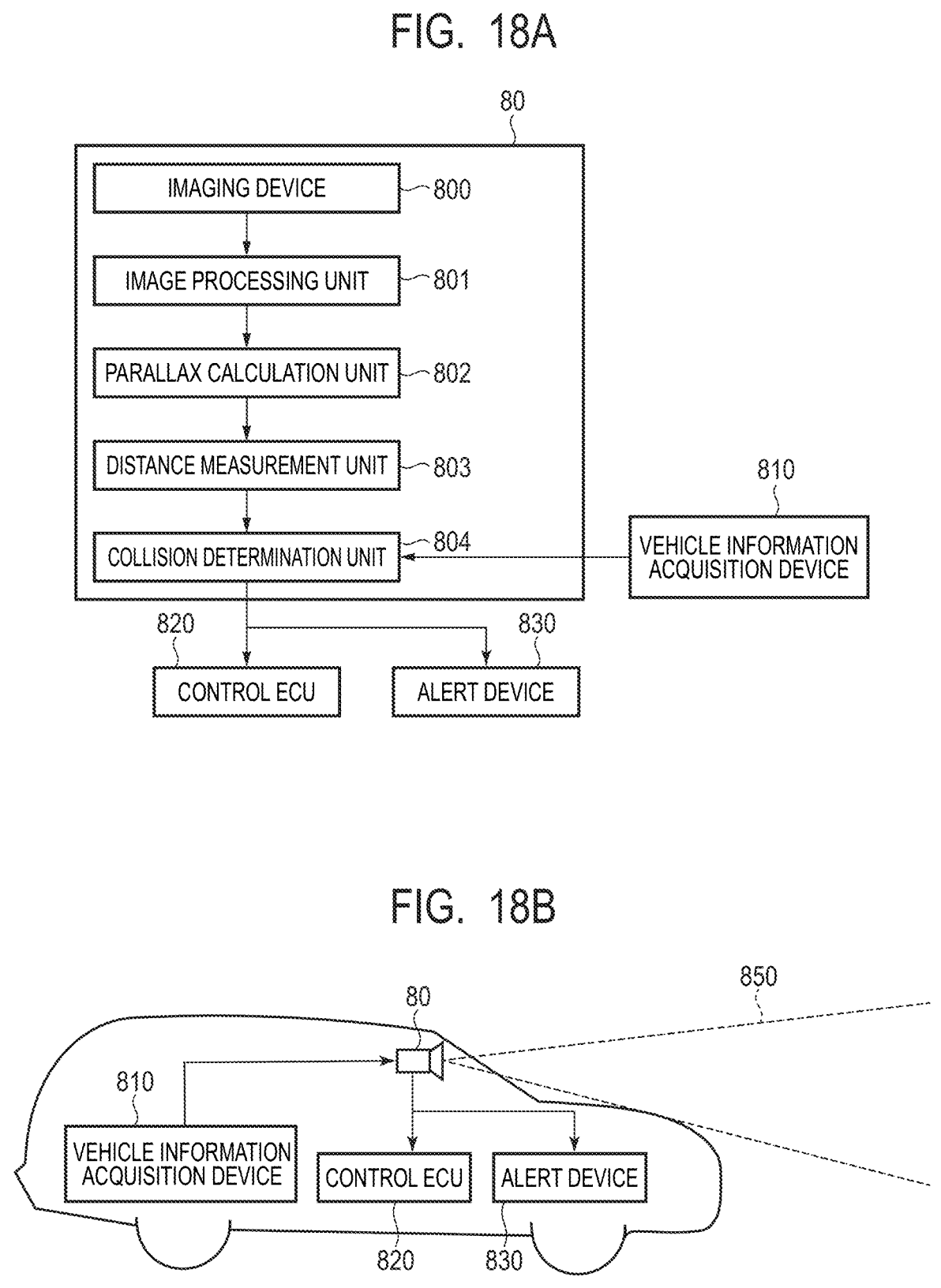

IMAGING DEVICE ~800

IMAGE PROCESSING UNIT ~801

PARALLAX CALCULATION UNIT ~802

DISTANCE MEASUREMENT UNIT ~803

810

COLLISION DETERMINATION UNIT ~804

VEHICLE INFORMATION ACQUISITION DEVICE

820

CONTROL ECU

830

ALERT DEVICE

VEHICLE INFORMATION ACQUISITION DEVICE

CONTROL ECU

ALERT DEVICE 820    830

PHOTOELECTRIC CONVERSION DEVICE AND SIGNAL PROCESSING DEVICE

BACKGROUND OF THE INVENTION

Field of the Invention

The present disclosure relates to a photoelectric conversion device and a signal processing device.

Description of the Related Art

Japanese Patent Application Laid-Open No. 2005-269098 discloses a solid-state imaging device including a plurality of pixels arranged in a matrix. In the solid-state imaging device disclosed in Japanese Patent Application Laid-Open No. 2005-269098, control of the plurality of pixels is performed on a row basis. In Japanese Patent Application Laid-Open No. 2005-269098, control of a reset operation and a readout operation is performed for pixels in each row, and control of a plurality of rows may be performed in parallel.

In a case where control of a plurality of rows is performed in parallel as in Japanese Patent Application Laid-Open No. 2005-269098, when the number of rows controlled in parallel changes, a potential of a power supply or the like may fluctuate. Due to this potential fluctuation, strip-shaped noise may appear in the image.

SUMMARY OF THE INVENTION

An object of the present disclosure is to provide a photoelectric conversion device and a signal processing device in which noise is reduced.

According to one disclosure of the present specification, there is provided a photoelectric conversion device including a pixel array including a plurality of pixels arranged to form a plurality of rows, a pixel control unit configured to control the plurality of pixels on a row basis, and a correction value generation unit configured to generate a correction value to be used for black level correction of a signal output from the pixel array. The pixel array includes an effective pixel region that outputs a signal according to incident light by photoelectric conversion and a correction signal acquisition region that outputs a correction signal for the black level correction. The correction signal acquisition region is arranged so as to correspond to each row of the effective pixel region. The pixel control unit is configured to control pixels of two or more rows in parallel in one row control period, and is configured to change the number of control rows in which the pixels are controlled in parallel in one frame period. The correction value generation unit generates the correction value using a first correction coefficient in a predetermined number of row control periods including a timing at which the number of control rows changes, and generates the correction value using a second correction coefficient in other row control periods.

According to one disclosure of the present specification, there is provided a signal processing device including a correction value generation unit configured to generate a correction value, and a correction unit configured to perform black level correction of a signal output from a pixel array based on the correction value. The signal processing device is configured to process a signal output from a photoelectric conversion device. The photoelectric conversion device including the pixel array including a plurality of pixels arranged to form a plurality of rows, and a pixel control unit configured to control the plurality of pixels on a row basis. The pixel array includes an effective pixel region that outputs a signal according to incident light by photoelectric conversion and a correction signal acquisition region that outputs a correction signal for the black level correction. The correction signal acquisition region is arranged so as to correspond to each row of the effective pixel region. The pixel control unit is configured to control pixels of two or more rows in parallel in one row control period, and is configured to change the number of control rows in which the pixels are controlled in parallel in one frame period. The correction value generation unit generates the correction value using a first correction coefficient in a predetermined number of row control periods including a timing at which the number of control rows changes, and generates the correction value using a second correction coefficient in other row control periods.

Further features of the present invention will become apparent from the following description of exemplary embodiments with reference to the attached drawings.

BRIEF DESCRIPTION OF THE DRAWINGS

FIG. 5 is a schematic diagram illustrating a connection relationship between a vertical scanning unit and the pixel array according to the first embodiment.

FIG. 9 is a block diagram of a correction value generation unit according to the first embodiment.

FIG. 10 is a flowchart illustrating a black level correction method according to the first embodiment.

FIGS. 18A and 18B are block diagrams illustrating a schematic configuration of equipment according to an eighth embodiment.

DESCRIPTION OF THE EMBODIMENTS

Figure 1:
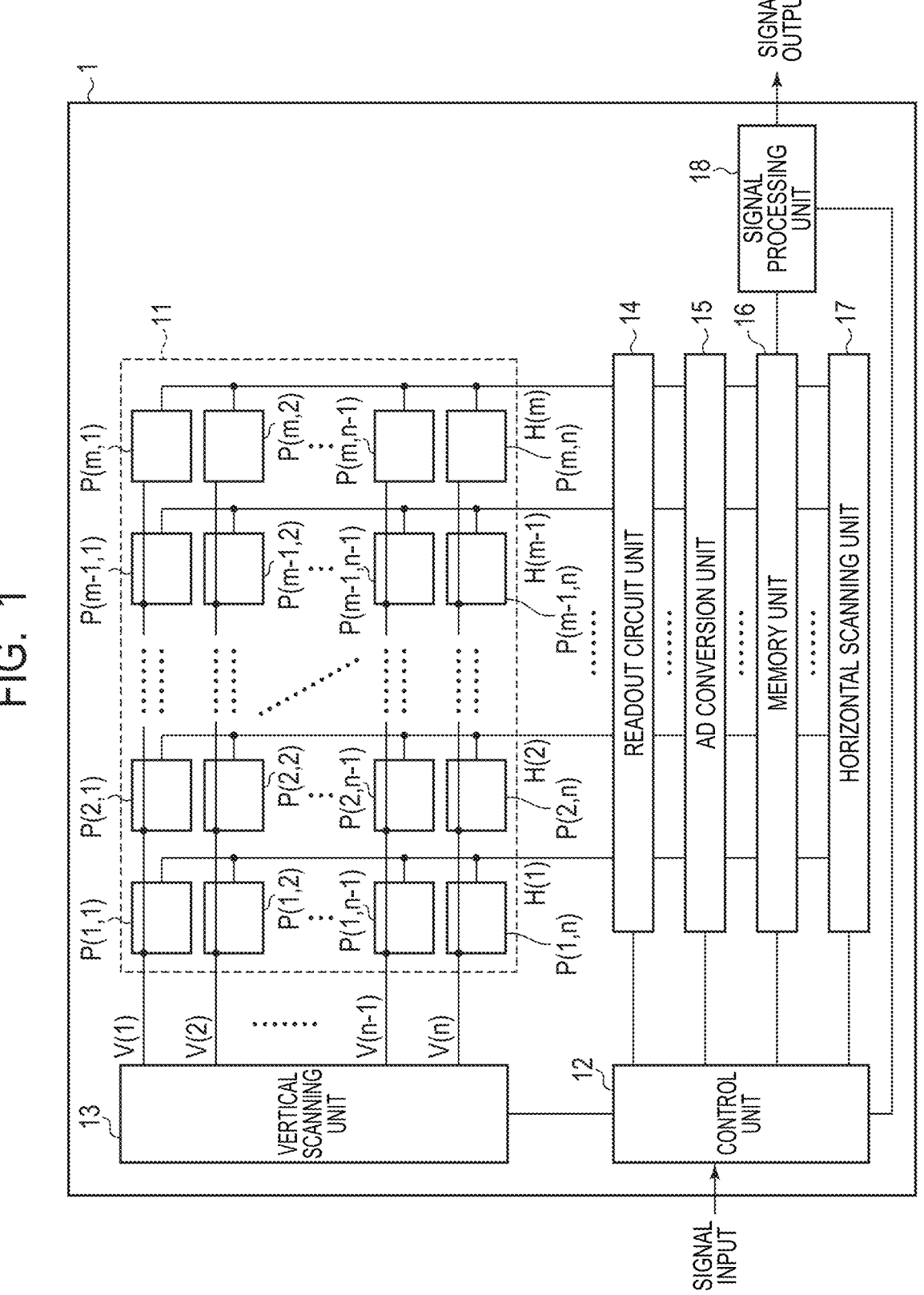
FIG. 1 is a block diagram illustrating a configuration example of a photoelectric conversion device according to a first embodiment.

Hereinafter, embodiments of the present invention will be described with reference to the drawings. The same or corresponding elements are denoted by the same reference numerals throughout the several drawings, and the description thereof may be omitted or simplified.

First Embodiment

A photoelectric conversion device according to a first embodiment will be described with reference to FIGS. 1 to 10. FIG. 1 is a block diagram illustrating a configuration example of a photoelectric conversion device 1 according to the present embodiment.

The photoelectric conversion device 1 includes a pixel array 11, a control unit 12, a vertical scanning unit 13, a readout circuit unit 14, an analog-to-digital conversion unit (AD conversion unit) 15, a memory unit 16, a horizontal scanning unit 17, and a signal processing unit 18.

The pixel array 11 includes a plurality of pixels P arranged to form a plurality of rows and a plurality of columns. The pixel P may include a photoelectric conversion element. In FIG. 1, pixels P arranged in a matrix of m columns and n rows are illustrated as rectangular blocks. In FIG. 1, coordinates represented by (column number, row number) is added to a reference numeral of a pixel. In this specification, a direction in which each row extends (row direction) is defined as a horizontal direction, and a direction in which each column extends (column direction) is defined as a vertical direction. Further, it is assumed that the row number of the upper end row is the first row, and the column number of the left end column is the first column.

The vertical scanning unit 13 is a control circuit (pixel control unit) that operates in response to a control signal from the control unit 12 and drives the pixels P constituting the pixel array 11 in units of rows. The vertical scanning unit 13 supplies control signals to the pixels P in units of rows via control lines V(1) to V(n) arranged in respective rows of the pixel array 11. The vertical scanning unit 13 may be configured using a shift register or an address decoder. Each of the control lines V(1) to V(n) may include a plurality of signal lines.

The vertical scanning unit 13 is connected to m pixels P arranged in a corresponding row via control lines V(1) to V(n), and selects a row to be reset or a row from which a signal is to be read. The pixels P in a row selected as the row to be reset are reset and start exposure. The pixels P in a row selected as the row from which the signal is to be read out simultaneously output signals to the readout circuit unit 14 via the corresponding vertical output lines H(1) to H(m). Each of the vertical output lines H(1) to H(m) may include a plurality of signal lines.

The operation performed by the vertical scanning unit 13 on the pixels P includes an electronic shutter scan and a readout scan. The electronic shutter scan refers to an operation of starting exposure by sequentially canceling a reset state of charge accumulation in the photoelectric conversion element to allow charge accumulation in a row unit for the pixels P of a part or all of the rows of the pixel array 11. In addition, the readout scan refers to an operation of sequentially outputting a signal corresponding to the amount of charge accumulated in the photoelectric conversion element in units of rows from the pixels P of a part or all of the rows of the pixel array 11. In the present disclosure, the electronic shutter scan and the readout scan are collectively referred to as pixel control.

The readout circuit unit 14 is a circuit that reads out an analog signal from the pixel P in each column. The readout circuit unit 14 may include an amplifier circuit that amplifies a signal output from the pixel P.

The AD conversion unit 15 converts the analog signal output from the readout circuit unit 14 into a digital signal. The memory unit 16 temporarily holds the digital signal output from the AD conversion unit 15. The AD conversion and the holding of the digital signal may be performed on a column basis. That is, the AD conversion unit 15 may include an AD conversion circuit corresponding to each column. The memory unit 16 may include a memory corresponding to each column.

The horizontal scanning unit 17 is a circuit that operates in response to a control signal from the control unit 12, and sequentially transfers the digital signals held in the memories of the respective columns of the memory unit 16 to the signal processing unit 18 on a column basis. The horizontal scanning unit 17 may be configured using a shift register or an address decoder. The digital signal of the address designated by the horizontal scanning unit 17 is sequentially read out from the memory unit 16 to the signal processing unit 18.

The signal processing unit 18 is a signal processing circuit that performs various kinds of digital signal processing for reducing noise generated in the pixel array 11, the readout circuit unit 14, the AD conversion unit 15, the memory unit 16, the horizontal scanning unit 17, and the like. The signal processing unit 18 outputs the processed signal to the outside of the photoelectric conversion device 1 in a predetermined format.

The control unit 12 is a control circuit that acquires a signal indicating setting information such as imaging conditions when the photoelectric conversion device 1 performs imaging, and generates a control signal based on the setting information. The control unit 12 outputs control signals to the vertical scanning unit 13, the readout circuit unit 14, the AD conversion unit 15, the memory unit 16, the horizontal scanning unit 17, and the signal processing unit 18 to control these units.

Figure 2:
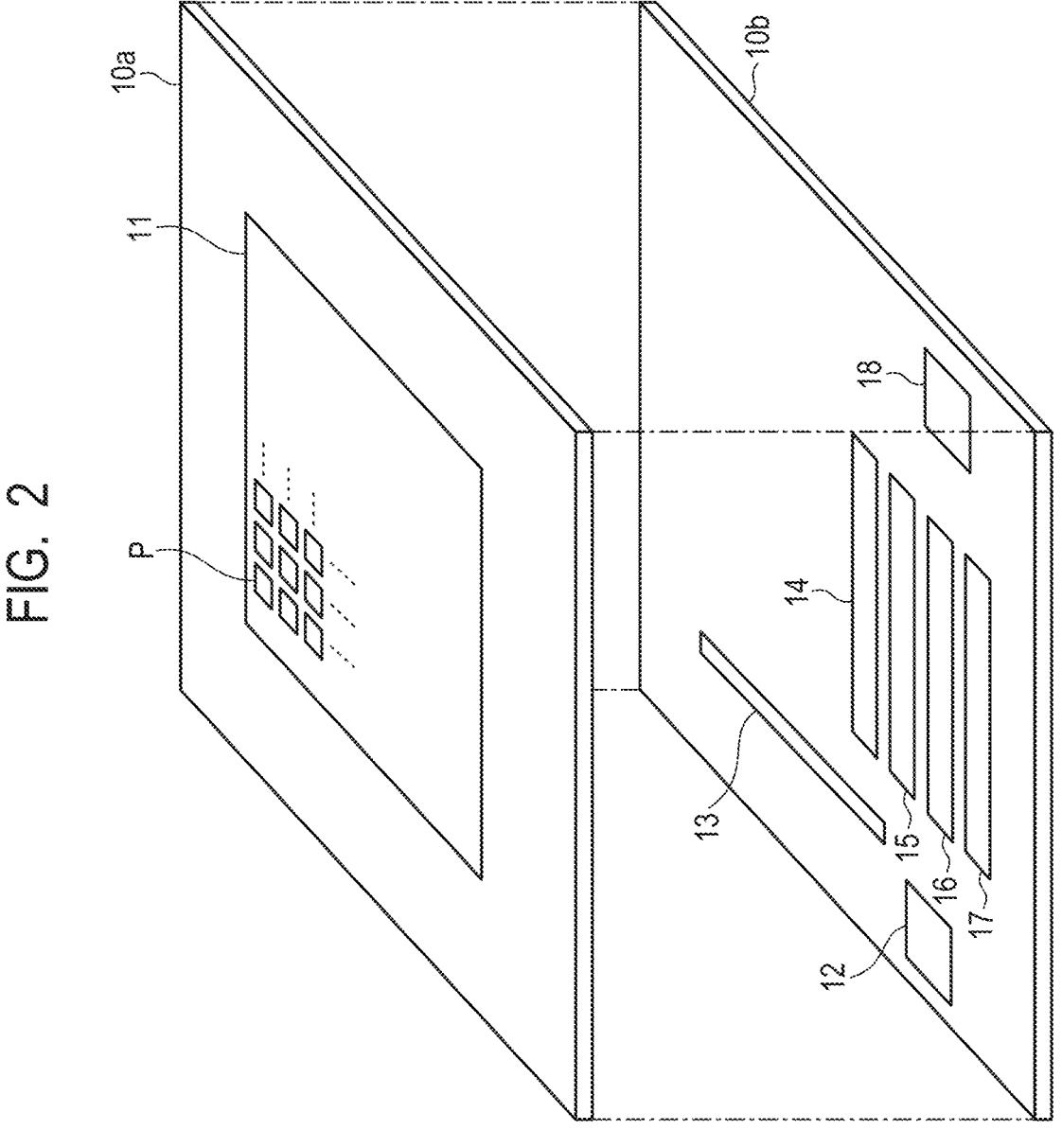
FIG. 2 is a perspective view illustrating a configuration example of the photoelectric conversion device according to the first embodiment.

The photoelectric conversion device 1 according to the present embodiment may be formed on one substrate or may be a stacked type in which a plurality of substrates are stacked. FIG. 2 is a perspective view illustrating a configuration example of the stacked photoelectric conversion device 1. As illustrated in FIG. 2, the photoelectric conversion device 1 may be a stacked photoelectric conversion device in which a pixel substrate 10a and a circuit substrate 10b are stacked and electrically connected to each other. The pixel substrate 10a and the circuit substrate 10b may be semiconductor substrates such as silicon.

Among the constituent elements of the photoelectric conversion device 1, the pixel array 11 may be arranged in the pixel substrate 10a. In addition, among the constituent elements of the photoelectric conversion device 1, the control unit 12, the vertical scanning unit 13, the readout circuit unit 14, the AD conversion unit 15, the memory unit 16, the horizontal scanning unit 17, and the signal processing unit 18 may be arranged in the circuit substrate 10b.

By configuring the photoelectric conversion device 1 as described above, an appropriate manufacturing process can be selected for each of an analog unit including the pixel array 11 and a logic unit including the signal processing unit 18 when the photoelectric conversion device 1 is manufactured. As a result, the characteristics of each part of the photoelectric conversion device 1 are improved. Therefore, the photoelectric conversion device 1 with improved image quality can be realized.

As described above, the pixel array 11 and the signal processing unit 18 are arranged in the photoelectric conversion device 1, but it is not limited thereto. The signal processing unit 18 may be arranged in a signal processing device different from the pixel array 11. In addition, the signal processing unit 18 may be arranged in a signal processing device external to the photoelectric conversion device 1, and in this case, the signal processing device corrects a signal output from the photoelectric conversion device 1 to generate image data or the like. The signal processing unit 18 may be realized by a computer including a processor (a central processing unit (CPU), a micro processing unit (MPU), or the like). The signal processing unit 18 may be realized by a circuit such as an application specific integrated circuit (ASIC).

Figure 3:
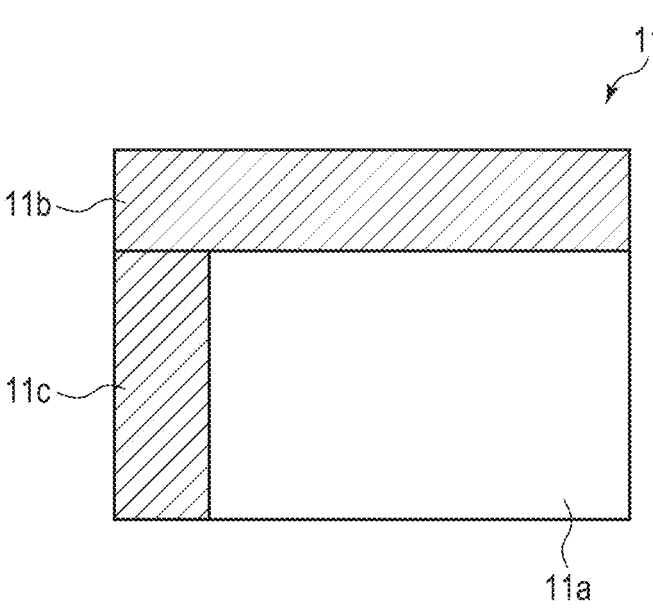
FIG. 3 is a schematic diagram illustrating a configuration example of a pixel array according to the first embodiment.

FIG. 3 is a schematic diagram illustrating a configuration example of the pixel array 11 according to the present embodiment. The pixel array 11 includes an effective pixel region 11a and correction signal acquisition regions 11b and 11c. The effective pixel region 11a is a region in which effective pixels each including a photoelectric conversion element are arranged. The effective pixel outputs a signal corresponding to light that passes through an optical system such as a lens and enters the pixel array 11. The correction signal acquisition regions 11b and 11c are regions in which correction pixels each outputting a correction signal used for black level correction are arranged. The correction signal acquisition regions 11b and 11c may be, for example, light shielding regions in which incident light to the photoelectric conversion element is optically shielded by arranging a light shielding portion such as a light shielding film on the photoelectric conversion element. Such a light shielding region may also be referred to as an optical black (OB) region.

The correction signal acquisition region 11c is arranged on the left side of the effective pixel region 11a so as to correspond to each row of the effective pixel region 11a. The correction signal acquisition region 11c may be referred to as an HOB region. The correction signal acquisition region 11c may be arranged on the right side of the effective pixel region 11a.

The correction signal acquisition region 11b is arranged above the effective pixel region 11a and the correction signal acquisition region 11c. The correction signal acquisition region 11b may be referred to as a VOB region. The correction signal acquisition region 11b may be arranged below the effective pixel region 11a and the correction signal acquisition region 11c.

The correction signal acquisition regions 11b and 11c are not limited to the OB region in which the photoelectric conversion element is shielded from light. For example, the correction signal acquisition regions 11b and 11c may be NULL regions having no photoelectric conversion element. The pixel P in the NULL region has the same configuration as that of the effective pixel in the effective pixel region 11a excluding the photoelectric conversion element. In this case, the correction signal acquisition region 11c may be referred to as a VNULL region, and the correction signal acquisition region 11b may be referred to as an HNULL region. The correction signal acquisition regions 11b and 11c may include both the OB region and the NULL region.

Figure 4:
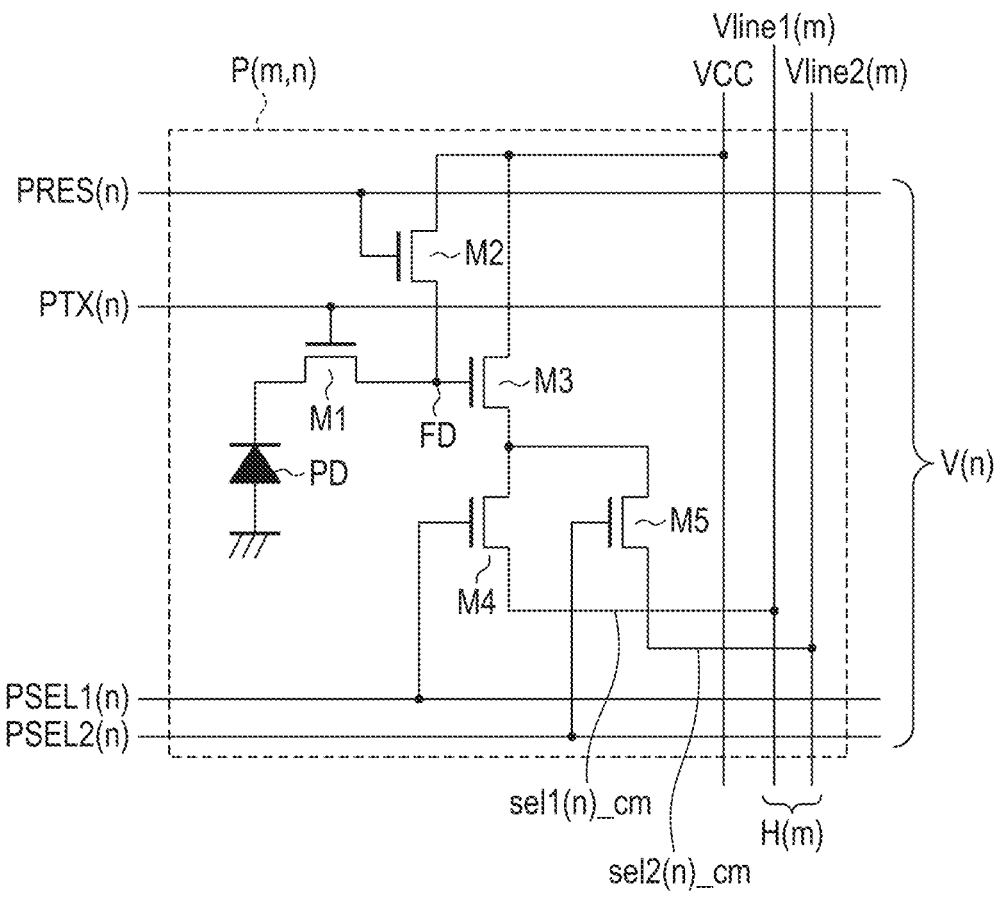
FIG. 4 is a circuit diagram illustrating a configuration example of a pixel according to the first embodiment.

FIG. 4 is a circuit diagram illustrating a configuration example of the pixel P according to the first embodiment.

FIG. 4 illustrates a pixel P(m, n) arranged in the m-th row and the n-th column of the pixel array 11, but other pixels P also have the same configuration. The pixel P includes a photoelectric conversion element PD, a transfer transistor M1, a reset transistor M2, an amplification transistor M3, and selection transistors M4 and M5.

The photoelectric conversion element PD is an element that photoelectrically converts incident light to generate and accumulate charges according to the incident light. The photoelectric conversion element PD is, for example, a photodiode. Here, it is assumed that the photoelectric conversion element PD is formed of a photodiode.

An anode of the photodiode constituting the photoelectric conversion element PD is connected to a ground node. A cathode of the photodiode constituting the photoelectric conversion element PD is connected to a source of the transfer transistor M1. A drain of the transfer transistor M1 is connected to a source of the reset transistor M2 and a gate of the amplification transistor M3. A connection node between the drain of the transfer transistor M1, the source of the reset transistor M2, and the gate of the amplification transistor M3 is a so-called floating diffusion FD.

A drain of the reset transistor M2 and a drain of the amplification transistor M3 are connected to a power supply voltage node (voltage VCC). A source of the amplification transistor M3 is connected to a drain of the selection transistor M4 and a drain of the selection transistor M5. A source of the selection transistor M4 is connected to a signal line Vline1(*m*) via a signal line sel1(*n*)_cm. A source of the selection transistor M5 is connected to a signal line Vline2(*m*) via a signal line sel2(*n*)_cm. The signal lines Vline1(*m*) and Vline2(*m*) are part of a plurality of signal lines constituting the vertical output lines H(m).

In the case of the pixel configuration illustrated in FIG. 4, each of the control lines arranged in each row of the pixel array 11 includes a transfer gate signal line, a reset signal line, and two selection signal lines. The transfer gate signal line of the n-th row is connected to gates of the transfer transistors M1 of the pixels P(1, n) to P(m, n) of the n-th row. The transfer gate signal line of the n-th row supplies a control signal PTX(n) output from the vertical scanning unit 13 to the gates of the transfer transistors M1 of the pixels P(1, n) to P(m, n).

The reset signal line of the n-th row is connected to gates of the reset transistors M2 of the pixels P(1, n) to P(m, n) of the n-th row. The reset signal line of the n-th row supplies a control signal PRES(n) output from the vertical scanning unit 13 to the gates of the reset transistors M2 of the pixels P(1, n) to P(m, n).

A first selection signal line of the n-th row is connected to gates of the selection transistors M4 of the pixels P(1, n) to P(m, n) of the n-th row. The first selection signal line of the n-th row supplies a control signal PSEL1(*n*) output from the vertical scanning unit 13 to the gates of the selection transistors M4 of the pixels P(1, n) to P(m, n).

A second selection signal line of the n-th row is connected to gates of the selection transistors M5 of the pixels P(1, n) to P(m, n) of the n-th row. The second selection signal line of the n-th row supplies a control signal PSEL2(*n*) output from the vertical scanning unit 13 to the gates of the selection transistors M5 of the pixels P(1, n) to P(m, n). As described above, a common control signal is supplied from the vertical scanning unit 13 to the pixels P in the same row.

In a case where each transistor is formed of an N-channel transistor, when a high-level control signal is supplied from the vertical scanning unit 13, the corresponding transistor becomes a conduction state. When a low-level control signal is supplied from the vertical scanning unit 13, the corresponding transistor becomes a non-conduction state. Here, it is assumed that the high level corresponds to the logical value "1" and the low level corresponds to the logical value "0". Each transistor constituting the pixel P may be an N-channel transistor, but may be a P-channel transistor.

The photoelectric conversion element PD converts (photoelectrically converts) the incident light into electric charges of an amount corresponding to the amount of the incident light, and accumulates the generated electric charges. When the transfer transistor M1 is turned on (conduction state), the charges held by the photoelectric conversion element PD is transferred to the floating diffusion FD. The floating diffusion FD has a capacitance component and holds the charges transferred from the photoelectric conversion element PD in its capacitance, and the potential of the floating diffusion FD becomes a potential corresponding to the amount of the charges by charge-to-voltage conversion at the capacitance.

The source of the amplification transistor M3 is supplied with a bias current from a current source (not illustrated) through the signal line Vline1(m) and the selection transistor M4 or through the signal line Vline2(m) and the selection transistor M5. The power supply voltage (voltage VCC) is supplied to the drain of the amplification transistor M3. That is, the amplification transistor M3 constitutes a source follower circuit having the gate as an input node. As a result, the amplification transistor M3 outputs a signal based on the potential of the floating diffusion FD to the signal line Vline1(m) via the selection transistor M4 or to the signal line Vline2(m) via the selection transistor M5.

The reset transistor M2 is turned on (conduction state) to reset the floating diffusion FD to a potential corresponding to the power supply voltage (voltage VCC). By turning on (conduction state) the transfer transistor M1 simultaneously with the reset transistor M2, the photoelectric conversion element PD can be reset to a potential corresponding to the voltage VCC. The selection transistor M4 switches the connection between the amplification transistor M3 and the signal line Vline1(m). The selection transistor M5 switches the connection between the amplification transistor M3 and the signal line Vline2(m).

The electronic shutter scan is an operation of sequentially performing an electronic shutter operation (first control) of the pixels P in units of rows. In the electronic shutter operation of the pixel P, the reset state of the photoelectric conversion element PD is canceled. The photoelectric conversion element PD is reset to a potential corresponding to the power supply voltage (voltage VCC) by turning on the transfer transistor M1 and the reset transistor M2. When the transfer transistor M1 is turned off from the reset state, the reset state of the photoelectric conversion element PD is canceled, and exposure (accumulation of charges) in the photoelectric conversion element PD is started.

The readout scan is an operation of sequentially performing a readout operation (second control) of the pixels P in units of rows. In the readout operation of the pixel P, readout of a noise signal (signal N) and readout of a signal (signal S) based on incident light are performed.

Reading of the signal N is performed, after the reset state of the floating diffusion FD is cancelled, by outputting a signal corresponding to the potential of the floating diffusion FD in the reset state to the signal line Vline1(m) or the signal line Vline2(m) by the amplification transistor M3. The reset state of the floating diffusion FD is canceled by turning off the reset transistor M2. At this time, the selection transistor M4 is turned on when the signal N is read to the signal line Vline1(m), and the selection transistor M5 is turned on when the signal N is read to the signal line Vline2(m).

The reading of the signal S is performed by transferring the charges held in the photoelectric conversion element PD to the floating diffusion FD after the reading of the signal N and outputting a signal corresponding to the amount of the charges transferred to the floating diffusion FD to the signal line Vline1(m) or the signal line Vline2(m). At this time, the selection transistor M4 is turned on when the signal S is read to the signal line Vline1(m), and the selection transistor M5 is turned on when the signal S is read to the signal line Vline2(m).

By performing correlated double sampling processing (S-N) on the signal S and the signal N read out in this manner, it is possible to acquire a pixel signal from which reset noise of the floating diffusion FD has been removed.

Figure 5:
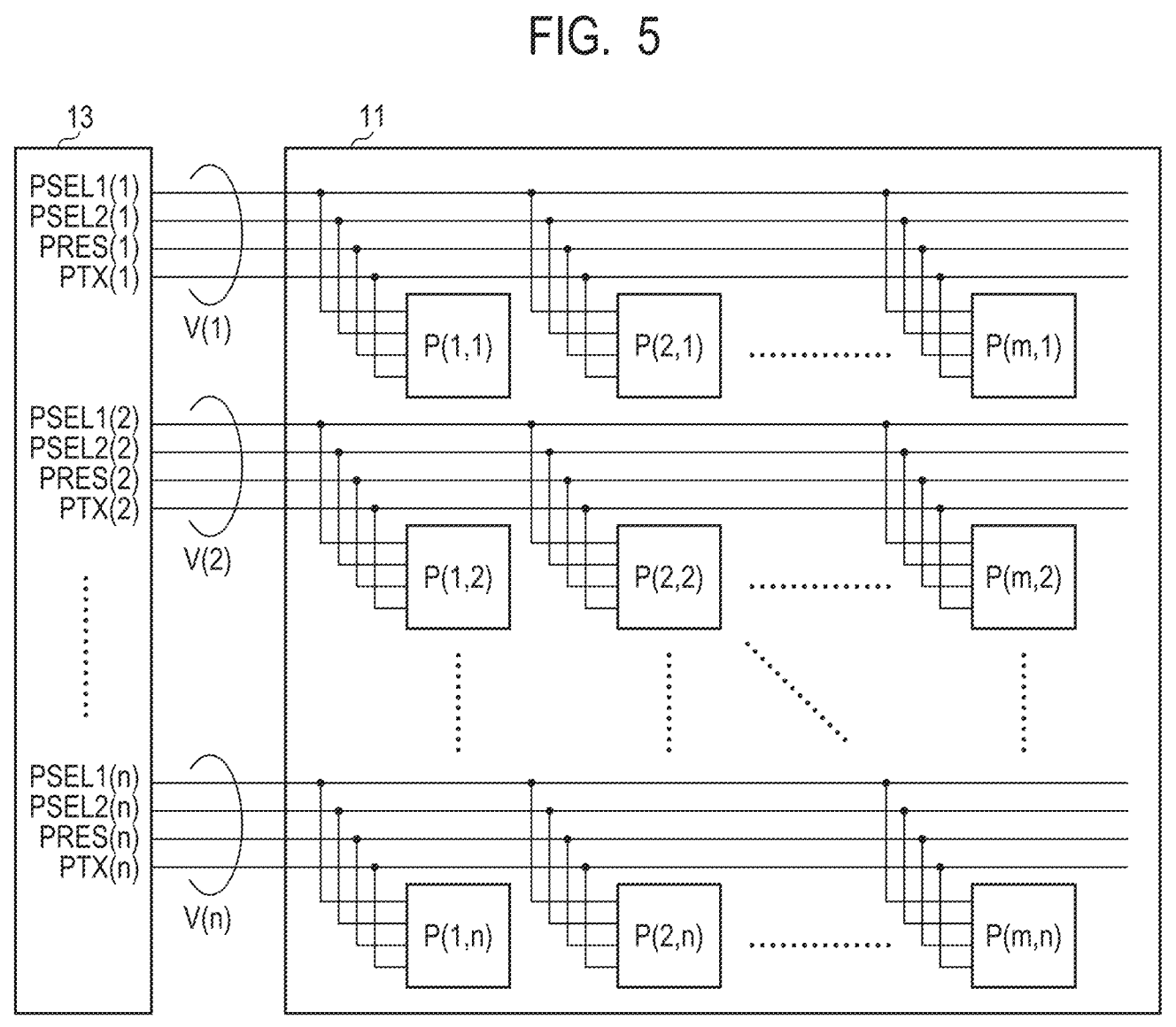

FIG. 5 is a schematic diagram illustrating a connection relationship between the vertical scanning unit 13 and the pixel array 11 according to the present embodiment. The vertical scanning unit 13 receives a control signal from the control unit 12, generates and outputs control signals PTX (1) to PTX(n), PRES(1) to PRES(n), PSEL1(1) to PSEL1 (n), and PSEL2(1) to PSEL2(n). The control signals PTX(k), PRES(k), PSEL1(k), and PSEL2(k) output from the vertical scanning unit 13 are input to the pixels P(1, k) to P(m, k) arranged in the k-th row via the control line V(k)(k is an integer from one to n).

By appropriately controlling the control signals PTX(k), PRES(k), PSEL1(k), and PSEL2(k), the vertical scanning unit 13 can perform the electronic shutter operation and the readout operation of the pixels P(1, k) to P(m, k) in the k-th row. By sequentially controlling the control signals PTX(k), PRES(k), PSEL1(k), and PSEL2(k) of each row, the electronic shutter scan and the readout scan can be performed.

Figure 6:
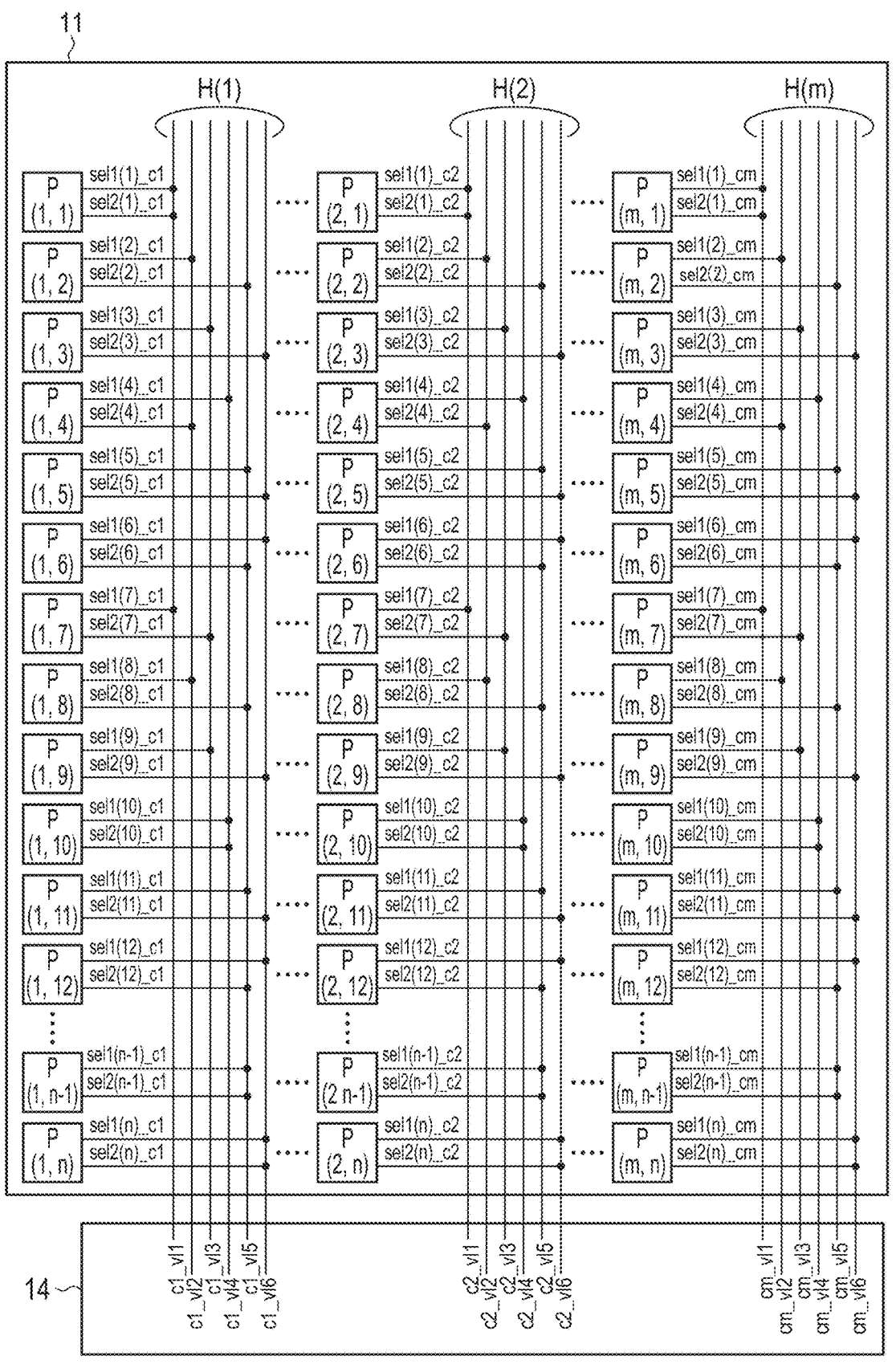
FIG. 6 is a schematic diagram illustrating a connection relationship between the pixel array and a readout circuit unit according to the first embodiment.

FIG. 6 is a schematic diagram illustrating a connection relationship between the pixel array 11 and the readout circuit unit 14 according to the present embodiment. Vertical output lines H(1) to H(m) are arranged in respective columns of the pixel array 11. Each of the vertical output lines H(1) to H(m) includes a plurality of signal lines. In the example of FIG. 6, each of the vertical output lines H(1) to H(m) includes six signal lines.

The vertical output line H(1) of the first column includes signal lines c1_vl1, c1_vl2, c1_vl3, c1_vl4, c1_vl5, and c1_vl6. The vertical output line H(2) of the second column includes signal lines c2_vl1, c2_vl2, c2_vl3, c2_vl4, c2_vl5, and c2_vl6. The vertical output line H(m) of the m-th column includes signal lines cm_vl1, cm_vl2, cm_vl3, cm_vl4, cm_vl5, and cm_vl6. Each signal line is connected to a constant current source (not illustrated). Note that the signal lines Vline1 and Vline2 described in FIG. 4 are either of these signal lines.

The source of the selection transistor M4 included in the pixel P(j, k) in the j-th column and the k-th row is connected to the vertical output line H(j) via a signal line sel1(k)_cj (j is an integer from one to m, and k is an integer from one to n). The source of the selection transistor M5 included in the pixel P(j, k) in the j-th column and the k-th row is connected to the vertical output line H(j) via a signal line sel2(k)_cj.

First, the connection relationship between the pixel array 11 and the readout circuit unit 14 will be described in more detail by focusing on the signal line sel1(k)_cj connected to the selection transistor M4.

The signal line sel1(k)_cj is connected to a predetermined signal line among the signal lines c1_vl1 to c1_vl6 in a cycle of six rows. In the example of FIG. 6, the signal line sel1(1)_cj is connected to the signal line cj_vl1. The signal line sel1(2)_cj is connected to the signal line cj_vl2. The signal line sel1(3)_cj is connected to the signal line cj_vl3. The signal line sel1(4)_cj is connected to the signal line cj_vl4. The signal line sel1(5)_cj is connected to the signal line cj_vl5. The signal line sel1(6)_cj is connected to the signal line cj_vl6. Similarly, the signal lines sel1(7)_cj to sel1($n$)_cj of the seventh and subsequent rows are connected to predetermined signal lines among the signal lines cj_vl1 to cj_vl6 in a cycle of six rows. For example, the signal line sel1(7)_cj is connected to the signal line cj_vl1. The signal line sel1(12)_cj is connected to the signal line cj_vl6. The signal line sel1($n$)_cj is connected to the signal line cj_vl6.

The signal lines sel1($k$)_cj are connected in the order of the signal lines cj_vl1, cj_vl2, cj_vl3, cj_vl4, cj_vl5, cj_vl6, cj_vl1, . . . in accordance with the row order; however, the order of connection is not necessarily this order. As long as the signal lines sel1($k$)_cj of the six consecutive rows are connected to different signal lines among the signal lines ck_vl1 to ck_vl6, the connection order may be another order.

Next, the connection relationship between the pixel array 11 and the readout circuit unit 14 will be described in more detail focusing on the signal line sel2($k$)_cj connected to the selection transistor M5. The signal lines sel2($k$)_cj are described separately as signal lines connected to the signal lines cj_vl1 to cj_vl4 and signal lines connected to the signal lines cj_vl5 and cj_vl6.

First, among the signal lines sel2($k$)_cj, signal lines connected to the signal lines cj_vl1 to cj_vl4 are described. Among the signal lines sel2($k$)_cj, the signal line sel2($12i_1+1$)_cj is connected to the signal line cj_vl1. The signal line sel2($12i_1+4$)_cj is connected to the signal line cj_vl2. The signal line sel2($12i_1+7$)_cj is connected to the signal line cj_vl3. The signal line sel2($12i_1+10$)_cj is connected to the signal line cj_vl4. Here, $i_1$ is an integer from zero to (n/12−1). For example, the signal line sel2(1)_cj is connected to the signal line cj_vl1. The signal line sel2(4)_cj is connected to the signal line cj_vl2. The signal line sel2(7)_cj is connected to the signal line cj_vl3. The signal line sel2(10)_cj is connected to the signal line cj_vl4. Similarly, the signal lines sel2(13)_cj to sel2($n$−2)_cj of the thirteenth and subsequent rows are connected to predetermined signal lines among the signal lines cj_vl1 to cj_vl4 in a cycle of 12 rows.

The signal line sel2($k$)_cj is connected to a predetermined signal line among the signal lines cj_vl1 to cj_vl4 at intervals of two rows, but the signal line sel2($k$)_cj connected to the signal lines cj_vl1 to cj_vl4 does not necessarily need to be at intervals of two rows. The signal line sel2($k$)_cj may be connected to a predetermined signal line among the signal lines cj_vl1 to cj_vl4 at intervals of S rows (S is an integer of one or more). The signal line sel2($k$)_cj is not necessarily connected to the signal lines cj_vl1, cj_vl2, cj_vl3, and cj_vl4 in the order of rows. It is sufficient that four signal lines sel2($k$)_cj respectively connected to the signal lines cj_vl1 to cj_vl4 are included in the consecutive (S+1)×4 signal lines sel2($k$)_cj.

Next, among the signal lines sel2($k$)_cj, signal lines connected to the signal lines cj_vl5 and cj_vl6 are described. Among the signal lines sel2($k$)_cj, the signal line sel2($6i_2+2$)_cj is connected to the signal line cj_vl5. The signal line sel2($6i_2+5$)_cj is connected to the signal line cj_vl6. Here, $i_2$ is an integer from zero to (n/6−1). For example, the signal line sel2(2)_cj is connected to the signal line cj_vl5. The signal line sel2(5)_cj is connected to the signal line cj_vl6. Similarly, the signal lines sel2(8)_cj to sel2($n$−1)_cj of the eighth and subsequent rows are connected to predetermined signal lines among the signal lines cj_vl5 and cj_vl6 in a cycle of six rows.

The signal line sel2($k$)_cj is connected to a predetermined signal line among the signal lines cj_vl5 and cj_vl6 at intervals of two rows, but the signal line sel2($k$)_cj connected to the signal lines cj_vl5 to cj_vl6 does not necessarily need to be at intervals of two rows. The signal line sel2($k$)_cj may be connected to a predetermined signal line among the signal lines cj_vl5 and cj_vl6 at intervals of S rows (S is an integer of one or more). The signal line sel2($k$)_cj is not necessarily connected to the signal lines cj_vl5 and cj_vl6 in the order of rows. It is sufficient that two signal lines sel2(N)_cj respectively connected to the signal lines cj_vl5 and cj_vl6 are included in the consecutive (S+1)×2 signal lines sel2($k$)_cj.

Among the signal lines sel2($k$)_cj, the signal line sel2($k$)_cj of the pixel P in a row other than the above may be connected to any of the six signal lines cj_vl1 to cj_vl6.

For example, as illustrated in FIG. 6, the signal line sel2($6i_2+3$) may be connected to the signal line cj_vl6, and the signal line sel2($6i_2+6$) may be connected to the signal line cj_vl5. Here, $i_2$ is an integer from zero to (n/6−1). According to this connection, analog addition of the pixel signal of the pixel P in the ($6i_2+2$)-th row and the pixel signal of the pixel P in the ($6i_2+6$)-th row can be performed on the signal line cj_vl5. Further, analog addition of the pixel signal of the pixel P in the ($6i_2+3$)-th row and the pixel signal of the pixel P in the ($6i_2+5$)-th row can be performed on the signal line cj_vl6.

Alternatively, the following configuration can be given as another example. The signal line sel2($12i_1+3$) is connected to the signal line cj_vl1, and the signal line sel2($12i_1+6$) is connected to the signal line cj_vl2. The signal line sel2($12i_1+9$) is connected to the signal line cj_vl3, and the signal line sel2($12i_1+12$) is connected to the signal line cj_vl4. Here, $i_1$ is an integer from zero to (n/12−1). According to this connection, analog addition of pixel signals can be performed on the signal lines cj_vl1 to cj_vl4. Specifically, analog addition of the pixel signal of the pixel P in the ($12i_1+1$)-th row and the pixel signal of the pixel P in the ($12i_1+3$)-th row can be performed on the signal line cj_vl1. Further, analog addition of the pixel signal of the pixel P in the ($12i_1+4$)-th row and the pixel signal of the pixel P in the ($12i_1+6$)-th row can be performed on the signal line cj_vl2. Further, analog addition of the pixel signal of the pixel P in the ($12i_1+7$)-th row and the pixel signal of the pixel P in the ($12i_1+9$)-th row can be performed on the signal line cj_vl3. Further, analog addition of the pixel signal of the pixel P in the ($12i_1+10$)-th row and the pixel signal of the pixel P in the ($12i_1+12$)-th row can be performed on the signal line cj_vl4.

By this connection, the number of selection transistors M4 and M5 connected to each of the six signal lines cj_vl1 to cj_vl6 arranged in each column becomes the same. Therefore, the parasitic capacitances (transistor capacitances) acting on the signal lines cj_vl1 to cj_vl6 can be made uniform.

Figure 7:
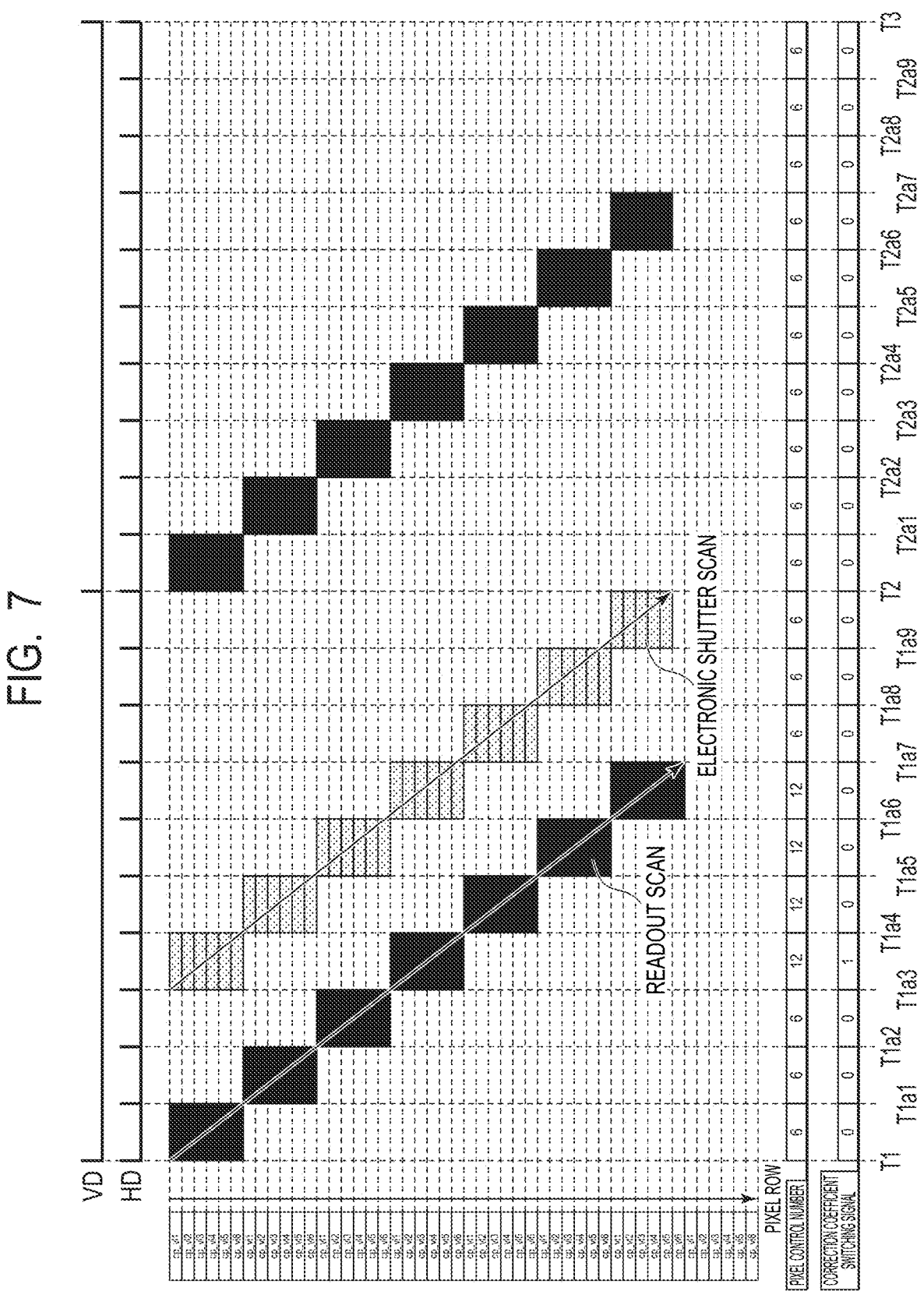
FIG. 7 is a timing chart illustrating an operation example of the photoelectric conversion device according to the first embodiment.

FIG. 7 is a timing chart illustrating an operation example of the photoelectric conversion device 1 according to the present embodiment. The electronic shutter scan and the readout scan in the photoelectric conversion device 1 will be described with reference to FIG. 7. In the present embodiment, it is assumed that a signal is output from each pixel P via the selection transistor M4. That is, it is assumed that signals are output from pixels P to the vertical output lines H(1) to H(m) via the signal lines sel1($k$)_cj, and the signal lines sel2($k$)_cj are not used.

The horizontal direction in FIG. 7 indicates the passage of time. The vertical direction in FIG. 7 schematically illustrates a pixel row in which the electronic shutter scan and the readout scan are performed, and the uppermost row is defined as a first row. The "cp_vl1", "cp_vl2", "cp_vl3", "cp_vl4", "cp_vl5", and "cp_vl6" in the frame at the left end of FIG. 7 indicate six signal lines from which signals are read out from pixels in a certain column (p-th column)(p is an integer from one to m).

In FIG. 7, the "VD" and "HD" indicate input timings of a vertical synchronization signal and a horizontal synchronization signal, respectively. The "pixel control number" in FIG. 7 indicates a total value of the number of pixel rows in which the electronic shutter operation and the readout operation are performed in parallel at the same time. The "correction coefficient switching signal" in FIG. 7 indicates a control signal used for switching the correction coefficient used for correction performed in the signal processing unit 18. The correction coefficient switching signal will be described later with reference to FIG. 9.

Pulses of the vertical synchronization signal VD are input at times T1, T2, and T3. That is, the time T1 is the start time of one frame period, and the time T2 is the start time of the next frame period. In the present embodiment, in one frame period between the time T1 and the time T2, each of the electronic shutter scan and the readout scan is performed once.

At the time T1, a readout operation starts. In a period from the time T1 to time T1*a*1, signals based on the charges accumulated in the photoelectric conversion elements PD of the pixels P arranged in the six rows from the first row to the sixth row are read. This period is one cycle of pulses of the horizontal synchronization signal HD, and is one row control period. That is, in the present embodiment, two or more rows are controlled in parallel in one row control period. Note that this charge accumulation is started by the electronic shutter scan in a frame period (not illustrated) one frame period before the frame period between the time T1 and the time T2.

In a period between the time T1 and the time T1*a*1, the vertical scanning unit 13 controls the control signals PSEL1 (1) to PSEL1(6) to the high level. As a result, the selection transistors M4 of the pixels P arranged in the six rows from the first row to the sixth row are turned on. By this operation, the pixel signal output from the pixel P on the first row is read out to the readout circuit unit 14 via the signal line cp_vl1. The pixel signal output from the pixel P on the second row is read out to the readout circuit unit 14 via the signal line cp_vl2. The pixel signal output from the pixel P on the third row is read out to the readout circuit unit 14 via the signal line cp_vl3. The pixel signal output from the pixel P on the fourth row is read out to the readout circuit unit 14 via the signal line cp_vl4. The pixel signal output from the pixel P on the fifth row is read out to the readout circuit unit 14 via the signal line cp_vl5. The pixel signal output from the pixel P on the sixth row is read out to the readout circuit unit 14 via the signal line cp_vl6. As described above, in the period from the time T1 to the time T1*a*1, the signal readouts of the six rows from the first row to the sixth row are performed in parallel.

A pulse of the horizontal synchronization signal HD is input at the time T1*a*1, and the next readout operation is started. In a period between the time T1*a*1 and time T1*a*2, signals based on charges accumulated in the photoelectric conversion elements PD of the pixels P arranged in six rows from the seventh row to the twelfth row are read.

In the period between the time T1*a*1 and the time T1*a*2, the vertical scanning unit 13 controls the control signals PSEL1(7) to PSEL1(12) to the high level. As a result, the selection transistors M4 of the pixels P arranged in the six rows from the seventh row to the twelfth row are turned on. By this operation, as described above, the pixel signals are read out to the readout circuit unit 14 from the pixels P arranged in the six rows from the seventh row to the twelfth row. As described above, in the period between the time T1*a*1 and the time T1*a*2, the signal readouts of the six rows from the seventh row to the twelfth row are performed in parallel.

After the time T1*a*2, the reading operation for six rows is sequentially performed at a time in synchronization with the horizontal synchronization signal HD.

In the frame period (from the time T1 to the time T2), the electronic shutter scan for the reading scan in the next frame period (from the time T2 to the time T3) is performed.

At time T1*a*3, the electronic shutter scan starts. In a period between the time T1*a*3 and time T1*a*4, the reset state of the photoelectric conversion elements PD of the pixels P arranged in the six rows from the first row to the sixth row is canceled.

In the period between the time T1*a*3 and the time T1*a*4, the vertical scanning unit 13 controls the control signals PTX(1) to PTX(6) from the high level to the low level. As a result, the transfer transistors M1 of the pixels P arranged in the six rows from the first row to the sixth row are turned off. By this electronic shutter operation, charge accumulation is started in the pixels P of six rows from the first row to the sixth row.

After the time T1*a*4, the electronic shutter operation for six rows is sequentially performed at a time in synchronization with the horizontal synchronization signal HD.

In the frame period from the time T2 to the time T3, the electronic shutter scan is not performed, and only the readout scan is performed from the time T2. The time difference between the electronic shutter scan starting from the time T1*a*3 and the readout scan starting from the time T2 corresponds to an exposure period in the pixel P.

In a period from the time T1 to the time T1*a*3 and a period from time T1*a*7 to time T2*a*7, only one of the electronic shutter scan and the readout scan is performed. Therefore, as illustrated in the "pixel control number" in FIG. 7, the pixel control number is six in these periods. On the other hand, in a period from the time T1*a*3 to the time T1*a*7, the electronic shutter scan and the readout scan are performed in an overlapping manner. Therefore, as illustrated in the "pixel control number" in FIG. 7, in these periods, the pixel control number is 12. As described above, in the present embodiment, the pixel control number can be changed in one frame period. In the operation of the present embodiment, the pixel control number changes at the time T1*a*3. As a result, the potential of the power supply or the like may fluctuate at a time near the time T1*a*3. Due to this potential fluctuation, strip-shaped noise may appear in the image. The strip-shaped noise may occur in the vicinity of the pixel row where the readout is performed near the timing at which the pixel control number changes.

In the example of FIG. 7, the start time of the readout scan and the start time of the electronic shutter scan are the time T1 and the time T1*a*3, respectively, but these start times may be different depending on the setting of the photoelectric conversion device 1 or the like. Therefore, the period in which the readout scan and the electronic shutter scan are performed in an overlapping manner may vary depending on the setting of the photoelectric conversion device 1 or the like.

The signal processing unit 18 of the present embodiment has a function of correcting noise caused by a change in the pixel control number as described above. Hereinafter, the correction processing will be described.

Figure 8:
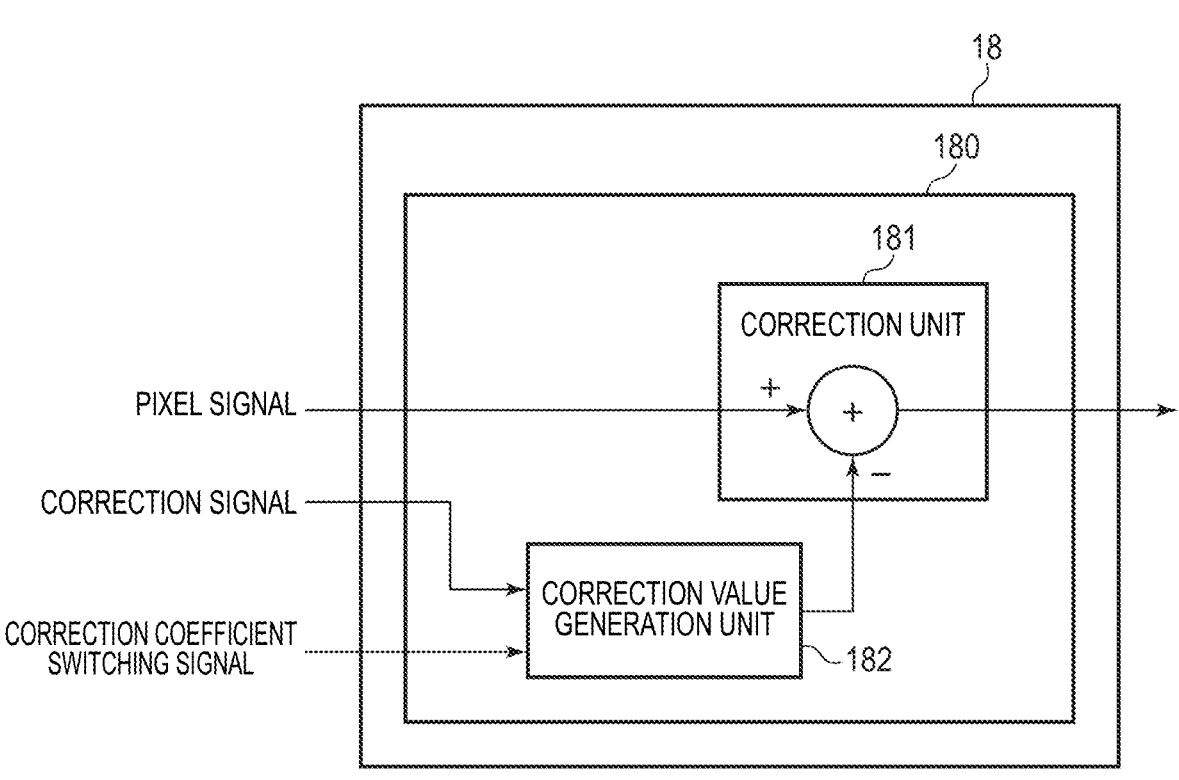
FIG. 8 is a block diagram of a signal processing unit according to the first embodiment.

FIG. 8 is a block diagram of the signal processing unit 18 according to the present embodiment. The signal processing unit 18 includes a black level correction circuit 180. The black level correction circuit 180 includes a correction unit 181 and a correction value generation unit 182.

The correction value generation unit 182 generates a correction value used for black level correction based on a correction signal acquired in the correction signal acquisition regions 11b and 11c and a correction coefficient switching signal. The correction unit 181 performs the black level correction on the pixel signal by subtracting the correction value from the pixel signal acquired in the effective pixel region 11a. In the generation of the correction value, a region (range of rows and columns) in the correction signal acquisition regions 11b and 11c where the correction signal is acquired can be appropriately set.

Figure 9:
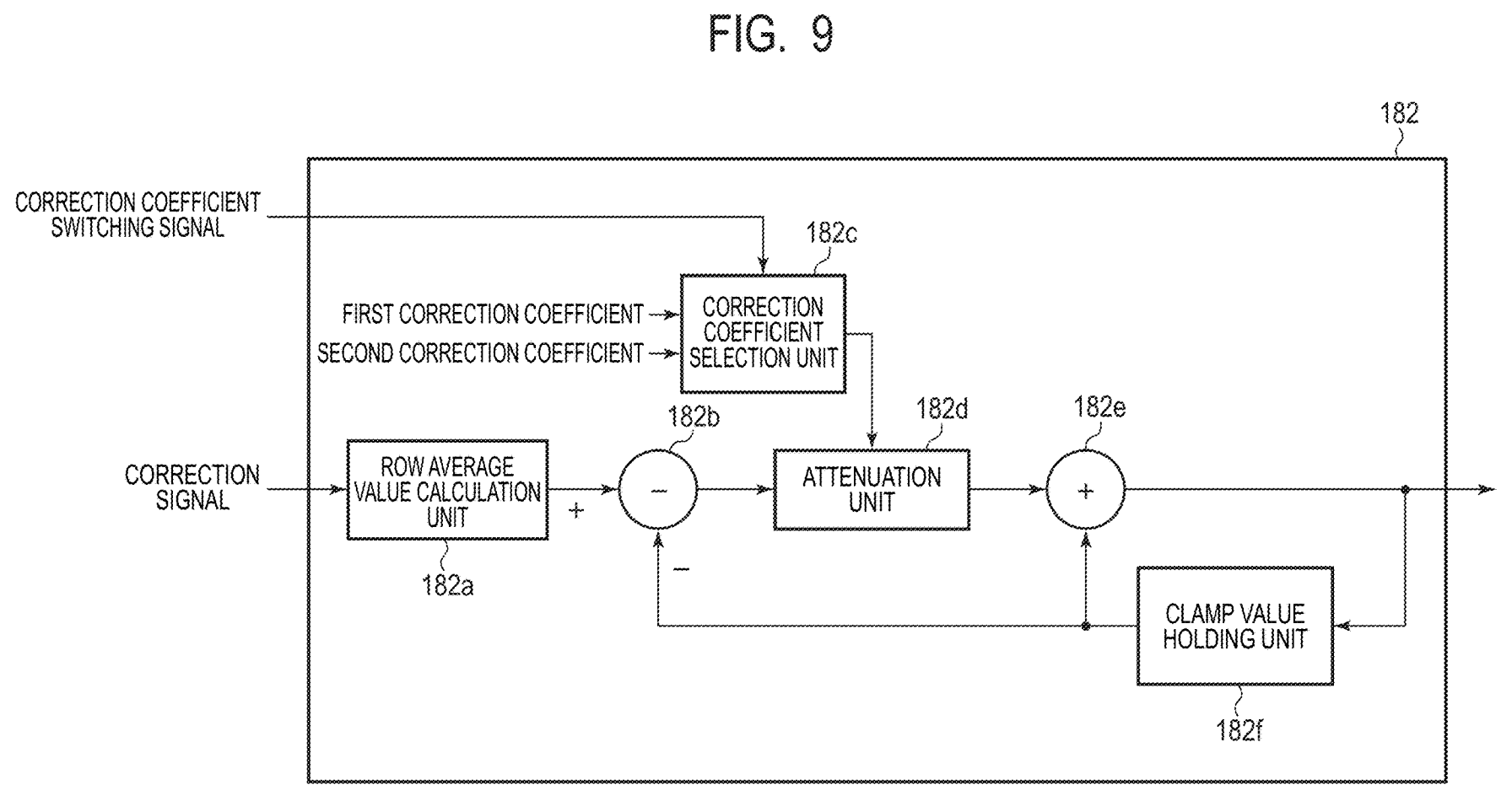

FIG. 9 is a block diagram of the correction value generation unit 182 according to the present embodiment. The correction value generation unit 182 includes a row average value calculation unit 182a, a subtraction unit 182b, a correction coefficient selection unit 182c, an attenuation unit 182d, an addition unit 182e, and a clamp value holding unit 182f.

The correction value generation unit 182 performs filter processing with reference to three values of a row average value of the correction signals calculated by the row average value calculation unit 182a, an attenuation coefficient that is set by the attenuation unit 182d, and a clamp value held in the clamp value holding unit 182f. A new clamp value is generated by this filter processing. In the present embodiment, the processing performed by the correction value generation unit 182 is processing of generating a clamp value by performing digital low-pass filter processing on the correction signal on a row basis. The digital low-pass filter in the present embodiment is an infinite impulse response (IIR) filter.

In the above-described filter processing, it is desirable to use the above-described IIR filter from the viewpoint of reducing the row variation. However, the processing is not limited to the IIR filter as long as the average value of the correction signals can be acquired as the clamp value. For example, an integral average may be used for the processing of the correction value generation unit 182.

The row average value calculation unit 182a calculates a row average value of the correction signals acquired in the correction signal acquisition regions 11b and 11c. The correction signals used to calculate the row average value is preferably acquired from the correction signal acquisition region 11c. This is because since the correction signal of the same row as the effective pixel region 11a can be acquired from the correction signal acquisition region 11c, the correction of the noise depending on the position of the pixel row can be effectively performed.

The row average value calculated by the row average value calculation unit 182a is input to the subtraction unit 182b. The subtraction unit 182b subtracts the clamp value held in the clamp value holding unit 182f from the row average value and outputs the result to the attenuation unit 182d.

The correction coefficient switching signal, a first correction coefficient, and a second correction coefficient are input to the correction coefficient selection unit 182c. These control signals may be input from the control unit 12, may be input from another block of the photoelectric conversion device 1, or may be input from the outside of the photoelectric conversion device 1, for example. The correction coefficient switching signal is a signal for transmitting a change in the pixel control number to the correction coefficient selection unit 182c. The first correction coefficient and the second correction coefficient are attenuation coefficients of attenuation processing performed in the attenuation unit 182d. The first correction coefficient and the second correction coefficient are values different from each other.

The correction coefficient selection unit 182c selects one of the first correction coefficient and the second correction coefficient based on the correction coefficient switching signal, and outputs the selected correction coefficient to the attenuation unit 182d. The correction coefficient selection unit 182c selects the first correction coefficient when the correction coefficient switching signal is "1", and the correction coefficient selection unit 182c selects the second correction coefficient when the correction coefficient switching signal is "0". The attenuation unit 182d attenuates the signal (a value obtained by subtracting the clamp value from the row average value) output from the subtraction unit 182b in accordance with the correction coefficient selected by the correction coefficient selection unit 182c.

The signal after the attenuation processing output from the attenuation unit 182d is input to the addition unit 182e. The addition unit 182e adds the output signal of the attenuation unit 182d and the clamp value held in the clamp value holding unit 182f. The correction value that is obtained by the addition is output from the correction value generation unit 182 to the correction unit 181. This correction value is held as a clamp value in the clamp value holding unit 182f, and is used to generate a correction value for the next row.

To summarize the above-described processing, the IIR filter processing performed by the loop of the subtraction unit 182b, the attenuation unit 182d, the addition unit 182e, and the clamp value holding unit 182f is expressed by the following expression (1).

$$\begin{aligned}(\text{clamp value of the } k\text{-}th \text{ row (correction value)}) = \\ (\text{attenuation coefficient}) \times (\text{row average value of} \\ \text{the } k\text{-}th \text{ row}) + (1 - \text{attenuation coefficient}) \times (\text{clamp} \\ \text{value of the } (k-1)\text{-}th \text{ row})\end{aligned} \quad (1)$$

Here, the "attenuation coefficient" in expression (1) is the attenuation coefficient of the attenuation unit 182d determined by the first correction coefficient or the second correction coefficient, and is a value greater than zero and equal to or less than one.

In the operation example of FIG. 6, the correction coefficient switching signal is "1" during the period from the time T1a3 to the time T1a4 when the pixel control number increases from six to 12. In the other periods, the correction coefficient switching signal is "1". Therefore, the correction coefficient selection unit 182c selects the first correction coefficient in the period from the time T1a3 to the time T1a4, and the correction coefficient selection unit 182c selects the second correction coefficient in the other periods.

The attenuation coefficient of the attenuation unit 182d set by the first correction coefficient is preferably greater than the attenuation coefficient of the attenuation unit 182d set by the second correction coefficient. According to this setting, the followability of the IIR filter can be made higher in the case where the first correction coefficient is set than in the case where the second correction coefficient is set. Thus, the second correction coefficient can be switched to the first correction coefficient when the pixel control number changes, and the correction value can be generated with high followability. Therefore, since the followability of the correction is enhanced at the timing when the pixel control number changes and the potential of the power supply or the like fluctuates, the noise can be corrected more effectively.

As the amount of change in the pixel control number increases, the amount of change in the potential of the power supply or the like also increases, and large noise may occur. Therefore, when the amount of change in the pixel control number is large, a larger value may be set as the first correction coefficient.

The number of types of correction coefficients selected by the correction coefficient selection unit 182*c* and applied to the attenuation unit 182*d* are not limited to two, and may be three or more. For example, in the operation of the photoelectric conversion device 1 illustrated in FIG. 7, when the number of types of values of the pixel control number is three or more, the number of types of correction coefficients equal to the number of types of values of the pixel control number may be selectable.

A method of detecting a change in the pixel control number in the generation and acquisition of the correction coefficient switching signal is not particularly limited. For example, the vertical scanning unit 13 may generate a flag for transmitting a change in the pixel control number, and the signal processing unit 18 may receive the flag. Further, the signal processing unit 18 may refer to a setting value for switching the pixel control from the control unit 12, for example.

In addition, the correction coefficient switching signal may be a value "1" at which the first correction coefficient is selected not only at the moment when the pixel control number is changed but also for a predetermined period after the pixel control number is changed. In addition, the correction coefficient switching signal may be a value "1" at which the first correction coefficient is selected during a predetermined period from before the change of the pixel control number to after the change. That is, the correction coefficient switching signal may be a value "1" at which the first correction coefficient is selected in a predetermined number of row control periods including the timing at which the pixel control number changes, and may be a value "0" at which the second correction coefficient is selected during other row control periods.

In the present embodiment, the example in which the correction coefficient selection unit 182*c* determines the switching of the correction coefficients based on the correction coefficient switching signal is described, but the determination of the switching of the correction coefficients may be performed further based on other conditions. For example, when a mechanical shutter is mounted on the photoelectric conversion device 1 and the mechanical shutter is used for capturing images, the determination may be made not to switch the correction coefficient.

FIG. 10 is a flowchart illustrating a black level correction method according to the present embodiment. An example of a processing procedure in the signal processing unit 18 will be described. Description of the same portions as those in FIGS. 8 and 9 may be omitted or simplified as appropriate.

In step S11, the photoelectric conversion device 1 acquires correction signals from the correction signal acquisition region 11*c* of the pixel array 11. The correction signals are input to the row average value calculation unit 182*a*.

In step S12, the row average value calculation unit 182*a* calculates a row average value from the correction signals.

In step S13, the correction coefficient selection unit 182*c* determines whether the value of the input correction coefficient switching signal is "1". In the step S13, when the correction coefficient switching signal is "1" (YES in the step S13), the process proceeds to step S14. In the step S14, the correction coefficient selection unit 182*c* selects the first correction coefficient and outputs the first correction coefficient to the attenuation unit 182*d*. Thereafter, the process proceeds to step S16.

In the step S13, when the correction coefficient switching signal is not "1" (NO in the step S13), the process proceeds to step S15. In the step S15, the correction coefficient selection unit 182*c* selects the second correction coefficient and outputs the second correction coefficient to the attenuation unit 182*d*. Thereafter, the process proceeds to the step S16.

In the step S16, the subtraction unit 182*b*, the attenuation unit 182*d*, the addition unit 182*e*, and the clamp value holding unit 182*f* generate a correction value by the above-described IIR filter. The correction value is held in the clamp value holding unit 182*f*, and the clamp value is updated. The correction value is output to the correction unit 181.

In step S17, the correction unit 181 subtracts the correction value, that is, the updated clamp value, from the pixel signal acquired in the effective pixel region 11*a* to perform black level correction of the pixel signal.

In the processing of the step S13, the process is switched based on whether the correction coefficient switching signal is "1", but other determination criteria may be used. For example, when the number of types of the correction coefficient is three or more, the correction coefficient switching signal may have a value corresponding to the type of the correction coefficient. In this case, the processing of the step S13 is replaced with processing of specifying the value of the correction coefficient switching signal.

When a plurality of rows are controlled in parallel, such as in the electronic shutter scan and the readout scan, the number of rows controlled in parallel may change. In such a case, strip-shaped noise may appear in the image due to a change in the potential of the power supply or the like. In the present embodiment, noise can be appropriately corrected by switching a correction coefficient used for black level correction in a period including a timing at which the number of rows controlled in parallel changes. Therefore, according to the present embodiment, a photoelectric conversion device in which noise is reduced is provided.

In the present embodiment, an example in which the correction coefficient is switched only once in one frame period is explained. However, the number of times of switching of the correction coefficient may be two or more in one frame period, and can be appropriately set according to the number of times of change of the pixel control number.

Second Embodiment

A photoelectric conversion device according to a second embodiment will be described with reference to FIG. 11. In the present embodiment, an example of a correction method in a driving method in which two readout scans are performed in parallel will be described. In the present embodiment, description of elements common to those of the first embodiment may be omitted or simplified.

Figure 11:
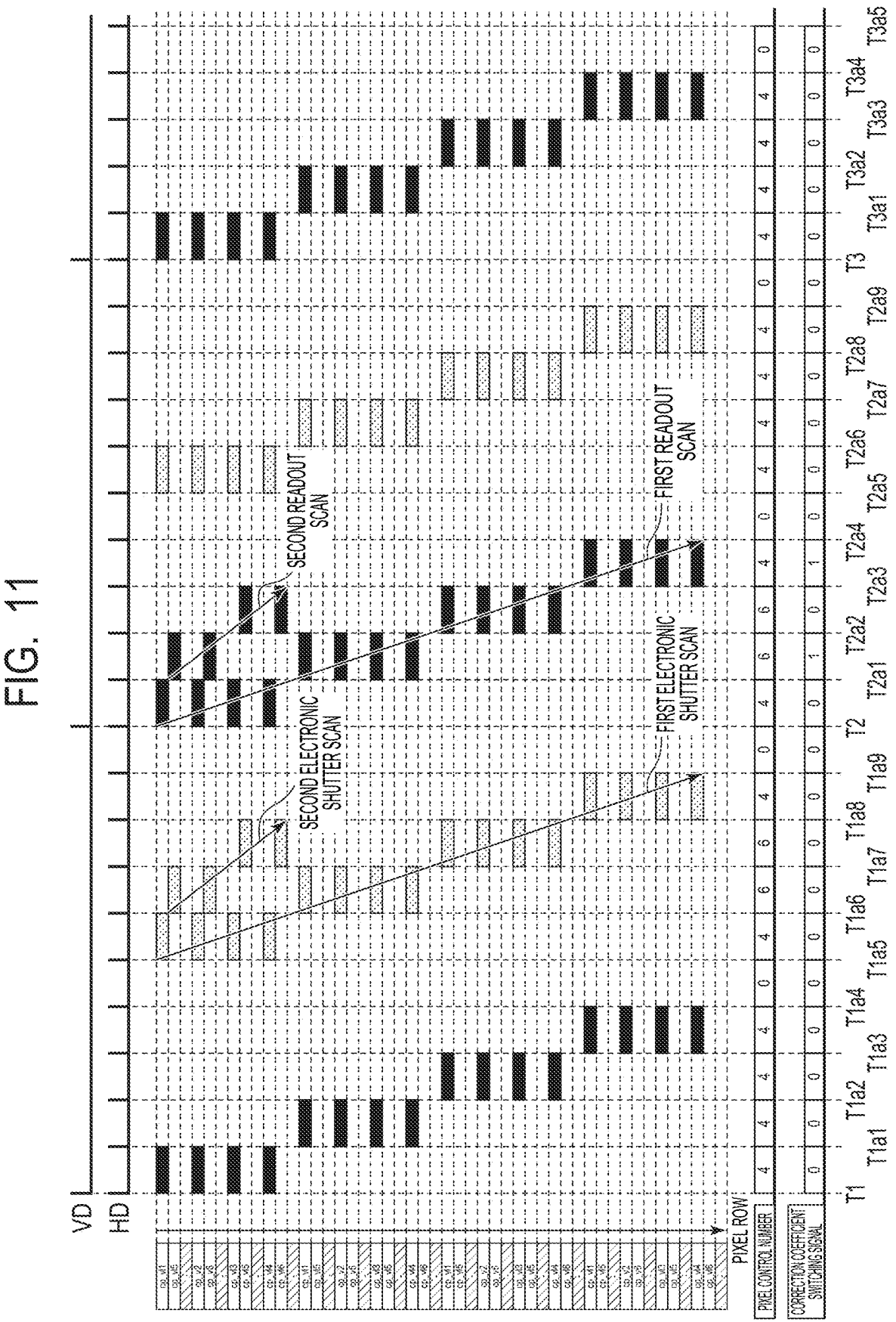
FIG. 11 is a timing chart illustrating an operation example of the photoelectric conversion device according to a second embodiment.

FIG. 11 is a timing chart illustrating an operation example of the photoelectric conversion device 1 according to the present embodiment. The electronic shutter scan and readout scan in the photoelectric conversion device 1 will be described with reference to FIG. 11. In the present embodiment, unlike the first embodiment, it is assumed that a signal is output from each pixel P via the selection transistor M5. That is, it is assumed that signals are output from pixels P to the vertical output lines H(1) to H(m) via the signal lines sel2(k)_cj, and the signal lines sel1(k)_cj are not used.

In the present embodiment, by performing two types of pixel control (first pixel control and second pixel control) in parallel, two sets of image data can be acquired in parallel. The image acquired by the first pixel control can be used as an image captured for live view, for example. The image acquired by the second pixel control can be used as an image for flicker detection, for example.

When image data is acquired by the readout scan, only the selection transistors M5 of the pixels P are used, and pixel signals are read out from six vertical output lines H(p) arranged in each column (p is an integer from one to m). At this time, in the readout scan (first readout scan) by the first pixel control, readout is performed using four of the six vertical output lines H(p)(signal lines cp_vl1, cp_vl2, cp_vl3, and cp_vl4) arranged in each column. In the readout scan (second readout scan) by the second pixel control, readout is performed using two of the six vertical output lines H(p) (signal lines cp_vl5 and cp_vl6) arranged in each column. The connection relationship among the pixel P in each row, the signal lines sel2(k)_cj, and the signal lines cp_vl1, cp_vl2, cp_vl3, cp_vl4, cp_vl5, and cp_vl6 is the same as that described with reference to FIG. 6 in the first embodiment, and thus description thereof is omitted.

In one frame period between time T1 and time T2, a first pixel control including one electronic shutter scan (first electronic shutter scan) and one readout scan (first readout scan) and a second pixel control including one electronic shutter scan (second electronic shutter scan) are performed.

At the time T1, the first readout scan of the first pixel control is started. In a period from the time T1 to time T1a1, signals based on the charges accumulated in the photoelectric conversion elements PD of the pixels P arranged in four rows of the first row, the fourth row, the seventh row, and the tenth row are read.

In the period between the time T1 and the time T1a1, the vertical scanning unit 13 controls the control signals PSEL2(1), PSEL2(4), PSEL2(7), and PSEL2(10) to the high level. As a result, the selection transistors M5 of the pixels P arranged in the four rows of the first row, the fourth row, the seventh row, and the tenth row are turned on. By this operation, the pixel signal output from the pixel P in the first row is read out to the readout circuit unit 14 via the signal line cp_vl1. The pixel signal output from the pixel P on the fourth row is read out to the readout circuit unit 14 via the signal line cp_vl2. The pixel signal output from the pixel P on the seventh row is read out to the readout circuit unit 14 via the signal line cp_vl3. The pixel signal output from the pixel P on the tenth row is read out to the readout circuit unit 14 via the signal line cp_vl4. As described above, in the period from the time T1 to the time T1a1, the signal readouts for the four rows of the first row, the fourth row, the seventh row, and the tenth row are performed in parallel.

A pulse of the horizontal synchronization signal HD is input at the time T1a1, and the next readout operation is started. In a period from the time T1a1 to time T1a2, signals based on the charges accumulated in the photoelectric conversion elements PD of the pixels P arranged in the four rows of the thirteenth row, the sixteenth row, the nineteenth row, and the twenty-second row are read.

In the period between the time T1a1 and the time T1a2, the vertical scanning unit 13 controls the control signals PSEL2(13), PSEL2(16), PSEL2(19), and PSEL2(22) to the high level. As a result, the selection transistors M5 of the pixels P arranged in the four rows of the thirteenth row, the sixteenth row, the nineteenth row, and the twenty-second row are turned on. By this operation, as described above, the pixel signals are read out to the readout circuit unit 14 from the pixels P arranged in the four rows of the thirteenth row, the sixteenth row, the nineteenth row, and the twenty-second row. As described above, in the period from the time T1a1 to the time T1a2, signal readouts for four rows of the thirteenth row, the sixteenth row, the nineteenth row, and the twenty-second row are performed in parallel.

After the time T1a2, the readout operation of four rows is sequentially performed in synchronization with the horizontal synchronization signal HD at a rate of one row for every three rows.

In the frame period (from the time T1 to the time T2), the first electronic shutter scan and the second electronic shutter scan for the first readout scan and the second readout scan in the next frame period (from the time T2 to time T3) are performed.

At time T1a5, the first electronic shutter scan of the first pixel control is started. In a period between the time T1a5 and time T1a6, the reset state of the photoelectric conversion elements PD of the pixels P arranged in the four rows of the first row, the fourth row, the seventh row, and the tenth row is canceled.

In the period between the time T1a5 and the time T1a6, the vertical scanning unit 13 controls the control signals PTX(1), PTX(4), PTX(7), and PTX(10) from the high level to the low level. As a result, the transfer transistors M1 of the pixels P arranged in the four rows of the first row, the fourth row, the seventh row, and the tenth row are turned off. By this electronic shutter operation, charge accumulation is started in the pixels P of four rows of the first row, the fourth row, the seventh row, and the tenth row.

After the time T1a6, the electronic shutter operation of four rows is sequentially performed in synchronization with the horizontal synchronization signal HD at a rate of one row for every three rows. After the time T1a6, the second electronic shutter scan of the second pixel control is performed in parallel with the first electronic shutter scan of the first pixel control.

At the time T1a6, the second electronic shutter scan of the second pixel control is started. In a period between the time T1a6 and time T1a7, the reset state of the photoelectric conversion elements PD of the pixels P arranged in the two rows of the second row and the fifth row is canceled.

In the period between the time T1a6 and the time T1a7, the vertical scanning unit 13 controls the control signals PTX(2) and PTX(5) from the high level to the low level. As a result, the transfer transistors M1 of the pixels P arranged in the two rows of the second row and the fifth row are turned off. By this electronic shutter operation, accumulation of charges is started in the pixels P of two rows of the second row and the fifth row.

After the time T1a7, the electronic shutter operation of two rows is sequentially performed in synchronization with the horizontal synchronization signal HD at a rate of one row for every three rows.

In one frame period between the time T2 and the time T3, a first pixel control including one electronic shutter scan (first electronic shutter scan) and one readout scan (first readout scan) and a second pixel control including one readout scan (second readout scan) are performed.

At the time T2, the first readout scan of the first pixel control is started. In a period between the time T2 and time T2*al*, signals based on the charges accumulated in the photoelectric conversion elements PD of the pixels P arranged in the four rows of the first row, the fourth row, the seventh row, and the tenth row are read. Since the first readout scan is similar to the first readout scan of the first pixel control starting from the time T1, the description thereof will be omitted. That is, after the time T2, the readout operation of four rows is sequentially performed in synchronization with the horizontal synchronization signal HD at a rate of one row for every three rows.

After the time T2*al*, the second readout scan of the second pixel control is performed in parallel with the first readout scan of the first pixel control. In a period between the time T2*al* and time T2*a2*, signals based on the charges of the photoelectric conversion elements PD of the pixels P arranged in two rows of the second row and the fifth row are read.

In the period between the time T2*al* and the time T2*a2*, the vertical scanning unit 13 controls the control signals PSEL2(2) and PSEL2(5) to the high level. As a result, the selection transistors M5 of the pixels P arranged in the two rows of the second row and the fifth row are turned on. By this operation, the pixel signal output from the pixel P in the second row is read out to the readout circuit unit 14 via the signal line cp_vl5. The pixel signal output from the pixel P on the fifth row is read out to the readout circuit unit 14 via the signal line cp_vl6. As described above, in the period between the time T2*al* and the time T2*a2*, the signal readouts for the two rows of the second row and the fifth row are performed in parallel. After the time T2*a2*, the readout operation of two rows is sequentially performed in synchronization with the horizontal synchronization signal HD at a rate of one row for every three rows.

At time T2*a5*, the first electronic shutter scan of the first pixel control corresponding to the first readout scan of the first pixel control of the next frame is started. The first electronic shutter scan is similar to the first electronic shutter scan started at the time T1*a6*. That is, after the time T2*a5*, the electronic shutter operation of four rows is sequentially performed in synchronization with the horizontal synchronization signal HD at a rate of one row for every three rows.

In one frame period after the time T3, the first pixel control including one readout scan (first readout scan) is performed. The first readout scan is similar to the first electronic shutter scan started from the time T2. That is, after the time T3, the readout operation of four rows is sequentially performed in synchronization with the horizontal synchronization signal HD at a rate of one row for every three rows.

In a period between the time T2*al* and time T2*a3*, the first readout scan and the second readout scan are performed in an overlapping manner. Therefore, as illustrated in "pixel control number" in FIG. 11, in these periods, the pixel control number is increased as compared with the other periods. In the operation of the present embodiment, the pixel control number changes at the times T2*al* and T2*a3*. As a result, the potential of the power supply or the like may fluctuate at times near the times T2*al* and T2*a3*. Due to this potential fluctuation, strip-shaped noise may appear in the image.

The start times of the first electronic shutter scan, the second electronic shutter scan, the first readout scan, and the second readout scan illustrated in the example of FIG. 11 may vary depending on the setting of the photoelectric conversion device 1 or the like. Therefore, the period in which the first readout scan and the second readout scan are performed in an overlapping manner may also vary depending on the setting of the photoelectric conversion device 1 or the like. The pixel control number and the number of scans in one frame period can be set as appropriate.

In the operation example of FIG. 11, the correction coefficient switching signal is "1" in the period between the time T2*al* and the time T2*a2* and the period between the time T2*a3* and the time T2*a4*. Therefore, the correction coefficient selection unit 182*c* selects the first correction coefficient in the period between the time T2*al* and the time T2*a2* and the period between the time T2*a3* and the time T2*a4*, and the correction coefficient selection unit 182*c* selects the second correction coefficient in the other periods. Other configurations and correction processing are the same as those in the first embodiment.

As described above, even in the driving method in which two readout scans are performed in parallel as in the present embodiment, correction can be performed by switching the correction coefficient used for black level correction at the timing when the number of rows controlled in parallel changes, as in the first embodiment. Therefore, according to the present embodiment, a photoelectric conversion device in which noise is reduced is provided.

Third Embodiment

A photoelectric conversion device according to a third embodiment will be described with reference to FIG. 12. In the present embodiment, an example of a correction method in a driving method in which the first readout scan of the first pixel control and the second electronic shutter scan of the second pixel control are performed in parallel will be described. In the present embodiment, description of elements common to the first embodiment or the second embodiment may be omitted or simplified.

Figure 12:
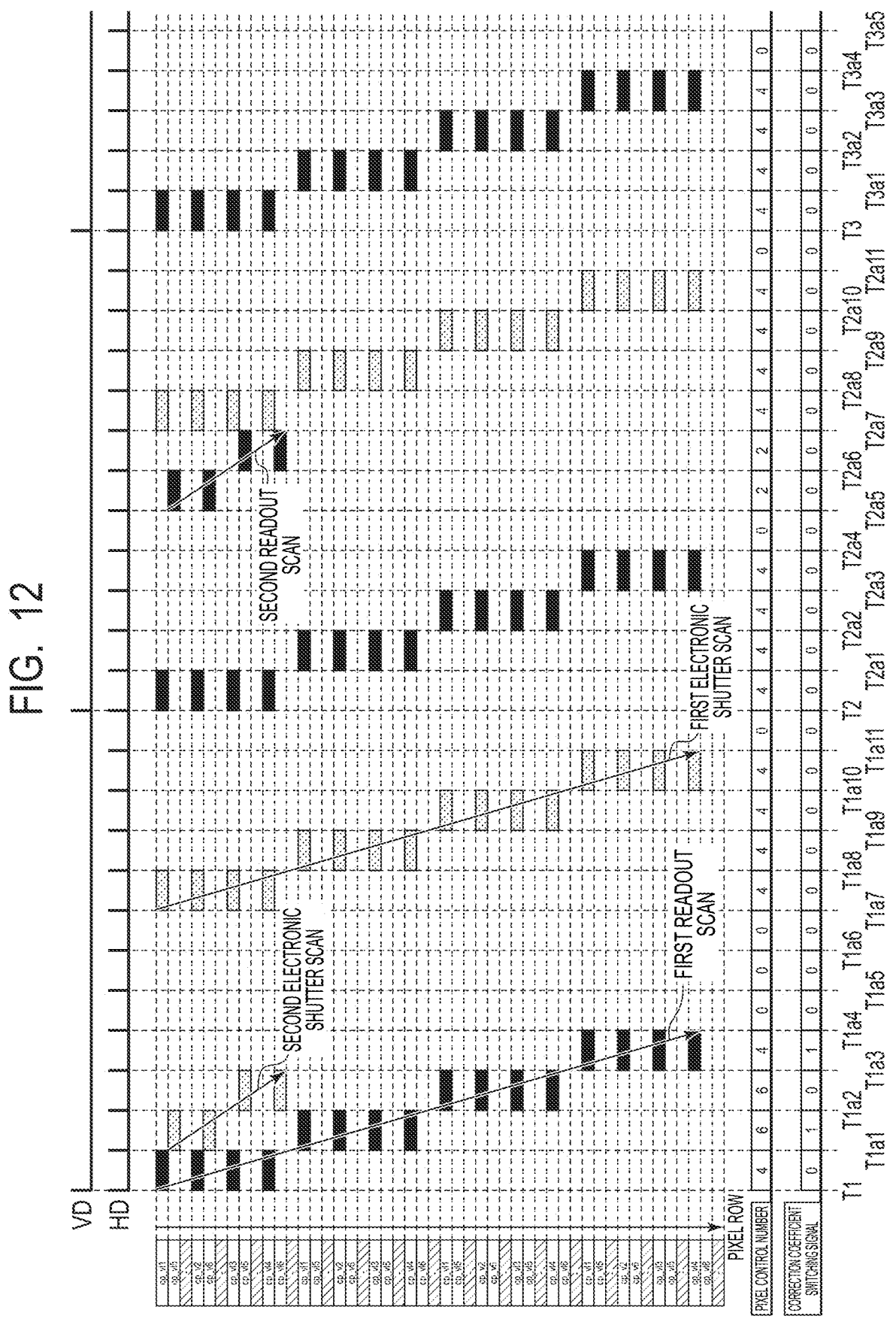
FIG. 12 is a timing chart illustrating an operation example of the photoelectric conversion device according to a third embodiment.

FIG. 12 is a timing chart illustrating an operation example of the photoelectric conversion device 1 according to the present embodiment. The electronic shutter scan and the readout scan in the photoelectric conversion device 1 will be described with reference to FIG. 12. Also in the present embodiment, similarly to the second embodiment, it is assumed that a signal is output from each pixel P through the selection transistor M5. That is, it is assumed that signals are output from pixels P to the vertical output lines H(1) to H(m) via the signal lines sel2(*k*)_cj, and the signal lines sel1(*k*)_cj are not used.

In one frame period between time T1 and time T2, first pixel control including one electronic shutter scan (first electronic shutter scan) and one readout scan (first readout scan) and second pixel control including one electronic shutter scan (second electronic shutter scan) are performed.

At the time T1, the first readout scan of the first pixel control is started. In a period from the time T1 to time T1*a1*, signals based on the charges accumulated in the photoelectric conversion elements PD of the pixels P arranged in the four rows of the first row, the fourth row, the seventh row, and the tenth row are read.

In a period from the time T1*a1* to time T1*a2*, signals based on the charges accumulated in the photoelectric conversion elements PD of the pixels P arranged in the four rows of the thirteenth row, the sixteenth row, the nineteenth row, and the twenty-second row are read. After the time T1*a2*, the readout operation of four rows is sequentially performed in synchronization with the horizontal synchronization signal HD at a rate of one row for every three rows.

In the frame period (from the time T1 to the time T2), the first electronic shutter scan and the second electronic shutter scan for the first readout scan and the second readout scan in the next frame period (from the time T2 to time T3) are performed.

At the time T1a1, the second electronic shutter scan of the second pixel control is started. In the period between the time T1a1 and the time T1a2, the reset state of the photoelectric conversion elements PD of the pixels P arranged in the two rows of the second row and the fifth row is canceled. After the time T1a2, the electronic shutter operation of two rows is sequentially performed in synchronization with the horizontal synchronization signal HD at a rate of one row for every three rows.

At time T1a7, the first electronic shutter scan of the first pixel control is started. In a period between the time T1a7 and time T1a8, the reset state of the photoelectric conversion elements PD of the pixels P arranged in the four rows of the first row, the fourth row, the seventh row, and the tenth row is canceled. After the time T1a8, the electronic shutter operation of four rows is sequentially performed in synchronization with the horizontal synchronization signal HD at a rate of one row for every three rows.

In one frame period between the time T2 and time T3, first pixel control including one electronic shutter scan (first electronic shutter scan) and one readout scan (first readout scan) and second pixel control including one readout scan (second readout scan) are performed.

At the time T2, the first readout scan of the first pixel control is started. In a period between the time T2 and time T2al, signals based on the charges accumulated in the photoelectric conversion elements PD of the pixels P arranged in the four rows of the first row, the fourth row, the seventh row, and the tenth row are read. Since the first readout scan is similar to the first readout scan of the first pixel control starting from the time T1, the description thereof will be omitted. That is, after the time T2, the readout operation of four rows is sequentially performed in synchronization with the horizontal synchronization signal HD at a rate of one row for every three rows.

At time T2a5, the second readout scan of the second pixel control is started. In a period between the time T2a5 and time T2a6, a signal based on the charges accumulated in the photoelectric conversion elements PD of the pixels P arranged in two rows of the second row and the fifth row is read. After the time T2a6, the readout operation of two rows is sequentially performed in synchronization with the horizontal synchronization signal HD at a rate of one row for every three rows.

At time T2a7, the first electronic shutter scan of the first pixel control corresponding to the first readout scan of the first pixel control of the next frame is started. The first electronic shutter scan is similar to the first electronic shutter scan started at the time T1a7. That is, after the time T2a7, the electronic shutter operation of four rows is sequentially performed in synchronization with the horizontal synchronization signal HD at a rate of one row for every three rows.

In one frame period after the time T3, the first pixel control including one readout scan (first readout scan) is performed. The first readout scan is similar to the first electronic shutter scan started from the time T2. That is, after the time T3, the readout operation of four rows is sequentially performed in synchronization with the horizontal synchronization signal HD at a rate of one row for every three rows.

In a period between the time T1a1 and time T1a3, the first readout scan and the second electronic shutter scan are performed in an overlapping manner. Therefore, as illustrated in "pixel control number" in FIG. 12, in these periods, the pixel control number is increased as compared with the other periods. In the operation of the present embodiment, the pixel control number changes at times T1a1 and T1a4. As a result, the potential of the power supply or the like may fluctuate at times near the times T1a1 and T1a4. Due to this potential fluctuation, strip-shaped noise may appear in the image.

The start times of the first electronic shutter scan, the second electronic shutter scan, the first readout scan, and the second readout scan illustrated in the example of FIG. 12 may vary depending on the setting of the photoelectric conversion device 1 or the like. Therefore, the period in which the first readout scan and the second electronic shutter scan are performed in an overlapping manner may also vary depending on the setting of the photoelectric conversion device 1 or the like. The pixel control number and the number of scans in one frame period can be set as appropriate.

In the operation example of FIG. 12, the correction coefficient switching signal is "1" in the period between the time T1a1 and the time T1a2 and the period between the time T1a3 and the time T1a4. Therefore, the correction coefficient selection unit 182c selects the first correction coefficient in the period between the time T1a1 and the time T1a2 and the period between the time T1a3 and the time T1a4, and the correction coefficient selection unit 182c selects the second correction coefficient in the other periods. Other configurations and correction processing are the same as those in the first embodiment.

As described above, even in the driving method in which the first readout scan of the first pixel control and the second electronic shutter scan of the second pixel control are performed in parallel as in the present embodiment, the correction coefficient can be switched in the same manner as in the second embodiment. That is, as in the first embodiment, correction can be performed by switching the correction coefficient used for black level correction at the timing when the number of rows controlled in parallel changes. Therefore, according to the present embodiment, a photoelectric conversion device in which noise is reduced is provided.

In the present embodiment, an example in which the first readout scan of the first pixel control and the second electronic shutter scan of the second pixel control are performed in parallel is explained, but the same applies to a case in which the first electronic shutter scan of the first pixel control and the second readout scan of the second pixel control are performed in parallel.

Since the second embodiment and the third embodiment have different noise generation factors, the values of the correction coefficients used for the black level correction may be set to different values between the second embodiment and the third embodiment.

Fourth Embodiment

A photoelectric conversion device according to a fourth embodiment will be described with reference to FIGS. 13 and 14. In the present embodiment, an example of a correction method in a case where a plurality of photoelectric conversion elements are arranged in one pixel P will be described. In the present embodiment, description of elements common to the first to third embodiments may be omitted or simplified.

Figure 13:
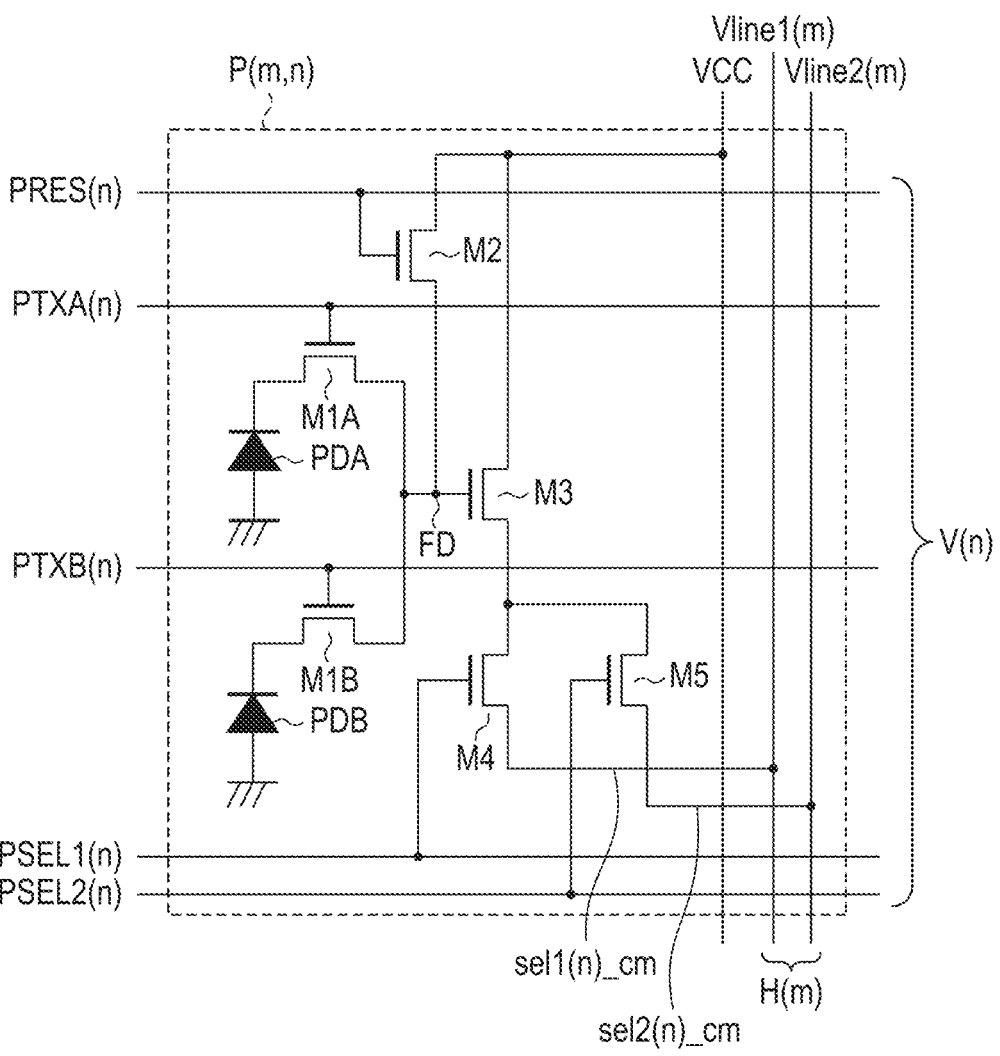
FIG. 13 is a circuit diagram illustrating a configuration example of the pixel according to a fourth embodiment.

FIG. 13 is a circuit diagram illustrating a configuration example of the pixel P according to the present embodiment. The photoelectric conversion device 1 according to the present embodiment is different from the photoelectric conversion device 1 according to the first embodiment in the configuration of at least a part of the pixels P among the plurality of pixels P constituting the pixel array 11. The pixel P of the photoelectric conversion device 1 according to the present embodiment includes photoelectric conversion elements PDA and PDB, transfer transistors MIA and M1B, a reset transistor M2, an amplification transistor M3, and selection transistors M4 and M5. That is, in the present embodiment, one pixel P has two photoelectric conversion elements PDA and PDB (first photoelectric conversion element and second photoelectric conversion element). The photoelectric conversion elements PDA and PDB of one pixel P are arranged so as to share one microlens, and light beams that have passed through different pupil regions of the incident optical system enter the photoelectric conversion elements PDA and PDB, respectively. In other words, one pixel P includes a sub-pixel A including the photoelectric conversion element PDA and a sub-pixel B including the photoelectric conversion element PDB. The photoelectric conversion elements PDA and PDB are, for example, photodiodes. Here, it is assumed that the photoelectric conversion elements PDA and PDB are each formed of a photodiode.

An anode of the photodiode constituting the photoelectric conversion element PDA is connected to a ground node. A cathode of the photodiode constituting the photoelectric conversion element PDA is connected to a source of the transfer transistor MIA. An anode of the photodiode constituting the photoelectric conversion element PDB is connected to the ground node. A cathode of the photodiode constituting the photoelectric conversion element PDB is connected to a source of the transfer transistor M1B. A drain of the transfer transistor MIA and a drain of the transfer transistor M1B are connected to a source of the reset transistor M2 and a gate of the amplification transistor M3. A connection node between the drain of the transfer transistor MIA, the drain of the transfer transistor M1B, the source of the reset transistor M2, and the gate of the amplification transistor M3 is a so-called floating diffusion.

A drain of the reset transistor M2 and a drain of the amplification transistor M3 are connected to a power supply voltage node (voltage VCC). The source of the amplification transistor M3 is connected to a drain of the selection transistor M4 and a drain of the selection transistor M5. A source of the selection transistor M4 is connected to a signal line Vline1($m$) via a signal line sel1($n$)_cm. A source of the selection transistor M5 is connected to a signal line Vline2 ($m$) via a signal line sel2($n$)_cm. The signal lines Vline1($m$) and Vline2($m$) are part of a plurality of signal lines constituting the vertical output line H(m).

In the case of the pixel configuration illustrated in FIG. 13, each of the control lines arranged in each row of the pixel array 11 includes two transfer gate signal lines, a reset signal line, and two selection signal lines. A first transfer gate signal line of the n-th row is connected to gates of the transfer transistors MIA of the pixels P(1, n) to P(m, n) of the n-th row. The first transfer gate signal line of the n-th row supplies a control signal PTXA(n) output from the vertical scanning unit 13 to the gates of the transfer transistors MIA of the pixels P(1, n) to P(m, n). A second transfer gate signal line of the n-th row is connected to gates of the transfer transistors M1B of the pixels P(1, n) to P(m, n) of the n-th row. The second transfer gate signal line of the n-th row supplies a control signal PTXB(n) output from the vertical scanning unit 13 to the gates of the transfer transistors M1B of the pixel P(1, n) to P(m, n). The reset signal line and the two selection signal lines are connected to the pixel P in the same manner as in FIG. 4, and thus description thereof is omitted.

In a case where each transistor is formed of an N-channel transistor, when a high-level control signal is supplied from the vertical scanning unit 13, the corresponding transistor becomes a conduction state. When a low-level control signal is supplied from the vertical scanning unit 13, the corresponding transistor becomes a non-conduction state. Here, it is assumed that the high level corresponds to the logical value "1" and the low level corresponds to the logical value "0". Each transistor constituting the pixel P may be an N-channel transistor, but may be a P-channel transistor.

The photoelectric conversion elements PDA and PDB convert (photoelectrically convert) the incident light into electric charges of an amount corresponding to the amount of the incident light, and accumulate the generated electric charges. When the transfer transistor MIA is turned on (conduction state), the charges held by the photoelectric conversion element PDA is transferred to the floating diffusion FD. When the transfer transistor M1B is turned on, the charges held by the photoelectric conversion element PDB is transferred to the floating diffusion FD. The floating diffusion FD has a capacitance component, and holds the charges transferred from the photoelectric conversion element PDA, PDB in its capacitance, and the potential of the floating diffusion FD becomes a potential corresponding to the amount of the charges by charge-to-voltage conversion at the capacitance.

The source of the amplification transistor M3 is supplied with a bias current from a current source (not illustrated) through the signal line Vline1($m$) and the selection transistor M4 or through the signal line Vline2($m$) and the selection transistor M5. The power supply voltage (voltage VCC) is supplied to the drain of the amplification transistor M3. That is, the amplification transistor M3 constitutes a source follower circuit having the gate as an input node. As a result, the amplification transistor M3 outputs a signal based on the potential of the floating diffusion FD to the signal line Vline1($m$) via the selection transistor M4 or to the signal line Vline2($m$) via the selection transistor M5.

The reset transistor M2 is turned on (conduction state) to reset the floating diffusion FD to a potential corresponding to the power supply voltage (voltage VCC). By turning on (conduction state) the transfer transistor MIA simultaneously with the reset transistor M2, the photoelectric conversion element PDA can be reset to a potential corresponding to the voltage VCC. By turning on (conduction state) the transfer transistor M1B simultaneously with the reset transistor M2, the photoelectric conversion element PDB can be reset to a potential corresponding to the voltage VCC.

As described in the first embodiment, the vertical scanning unit 13 appropriately controls the transfer transistors MIA and M1B, the reset transistor M2, and the selection transistors M4 and M5. Accordingly, the noise signal (signal N) and the signal (signal S) corresponding to the amount of incident light to the photoelectric conversion elements PDA and PDB can be read from each pixel P.

In addition, in the pixel P of the present embodiment, the two photoelectric conversion elements PDA and PDB share one floating diffusion FD. From such a pixel P, a signal based on the charges generated in the photoelectric conversion element PDA and a signal based on the charges generated in the photoelectric conversion element PDB can be read separately or in combination. For example, first, the signal N and the signal S (signal A) based on the charges generated in the photoelectric conversion element PDA are read, and then the signal N and the signal S (signal B) based on the charges generated in the photoelectric conversion element PDB are read. The signal A and the signal B can be used as signals for focus detection. A signal A+B obtained by adding the signal A and the signal B can be used as a signal for generating an image.

Figure 14:
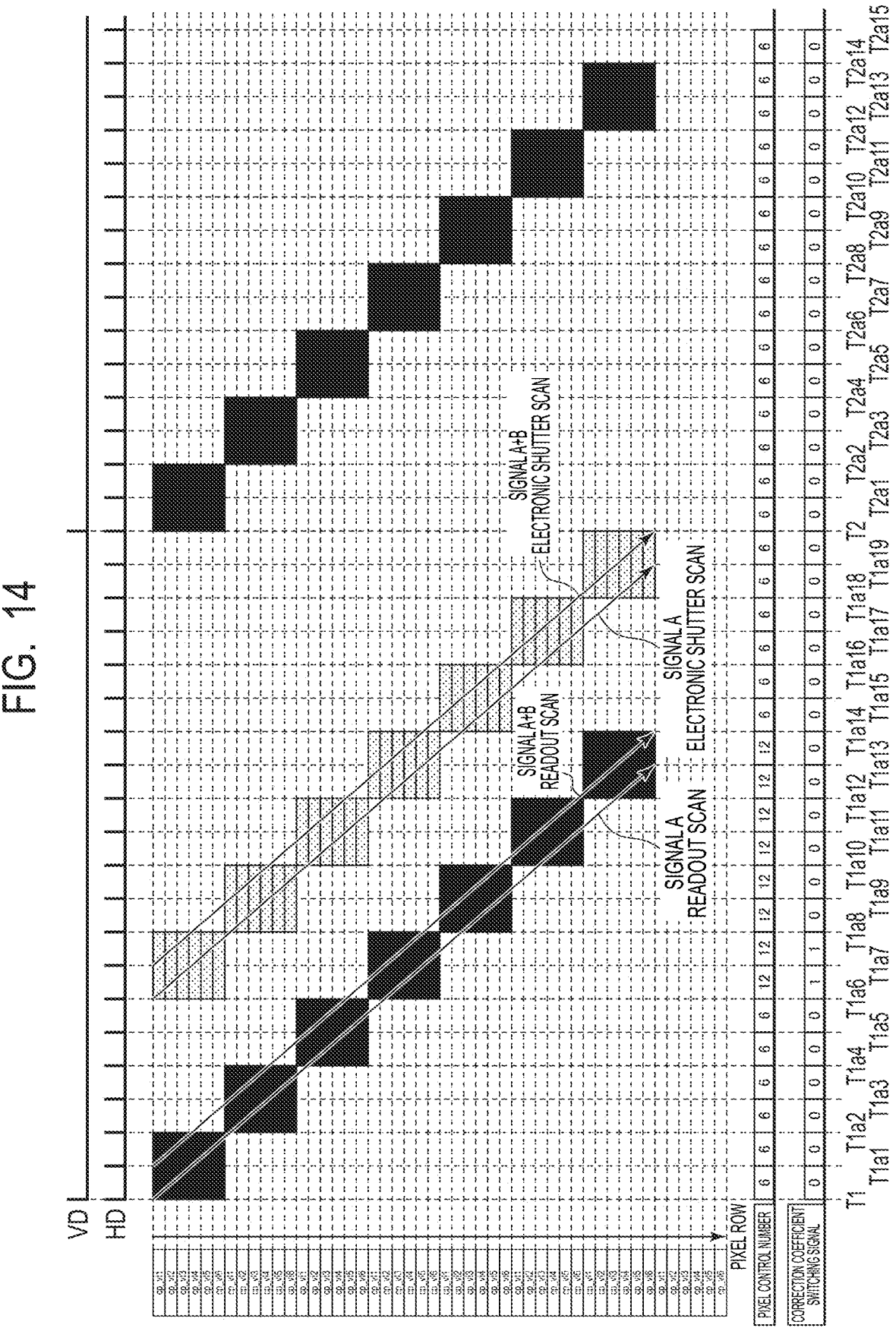
FIG. 14 is a timing chart illustrating an operation example of the photoelectric conversion device according to the fourth embodiment.

FIG. 14 is a timing chart illustrating an operation example of the photoelectric conversion device 1 according to the present embodiment. The electronic shutter scan and the readout scan in the photoelectric conversion device 1 will be described with reference to FIG. 14. In the present embodiment, similarly to the first embodiment, it is assumed that a signal is output from each pixel P via the selection transistor M4. That is, it is assumed that signals are output from pixels P to the vertical output lines H(1) to H(m) via the signal lines sel1(k)_cj, and the signal lines sel2(k)_cj are not used.

In one frame period between time T1 and time T2, one electronic shutter scan and one readout scan are performed. In addition, an acquisition of the signal A and an acquisition of the signal A+B are continuously performed in a series of scans.

At the time T1, the readout scan starts. In a period from the time T1 to time T1a1, the signals A based on the charges accumulated in the photoelectric conversion elements PDA of the pixels P arranged in the six rows from the first row to the sixth row are read.

In a period from the time T1a1 to time T1a2, signals A+B based on the charges accumulated in the photoelectric conversion elements PDA and PDB of the pixels P arranged in the six rows from the first row to the sixth row are read.

In a period from the time T1a2 to time T1a3, the signals A based on the charges accumulated in the photoelectric conversion elements PDA of the pixels P arranged in the six row from the seventh row to the twelfth row are read.

In a period from the time T1a3 to time T1a4, signals A+B based on the charges accumulated in the photoelectric conversion elements PDA and PDB of the pixels P arranged in the six row from the seventh row to the twelfth row are read.

After the time T1a4, the reading operation of the signals A and the signals A+B is sequentially performed six rows at a time in synchronization with the horizontal synchronization signal HD. In the frame period (from the time T1 to the time T2), the electronic shutter scan for the reading scan in the next frame period (from the time T2 to time T3) is performed.

At time T1a6, the electronic shutter scan starts. In a period between the time T1a6 and time T1a7, the reset state of the photoelectric conversion elements PDA of the pixels P arranged in the six rows from the first row to the sixth row is canceled.

In a period between the time T1a7 and time T1a8, the reset state of the photoelectric conversion elements PDB of the pixels P arranged in the six rows from the first row to the sixth row is canceled. After the time T1a7, the electronic shutter operation is sequentially performed six rows at a time in synchronization with the horizontal synchronization signal HD.

In one frame period between the time T2 and the time T3, the readout scan is performed. This readout scan is similar to the readout scan started from the time T1.

In a period between the time T1a6 and time T1a14, the readout scan and the electronic shutter scan are performed in an overlapping manner. Therefore, as illustrated in "pixel control number" in FIG. 14, in these periods, the pixel control number is increased as compared with the other periods. In the operation of the present embodiment, the pixel control number changes at the time T1a6. As a result, the potential of the power supply or the like may fluctuate at a time near the time T1a6. Due to this potential fluctuation, strip-shaped noise may appear in the image.

The start times of the electronic shutter scan and the readout scan illustrated in the example of FIG. 14 may vary depending on the setting of the photoelectric conversion device 1 or the like. Therefore, the period in which the electronic shutter scan and the readout scan are performed in an overlapping manner may vary depending on the setting of the photoelectric conversion device 1 or the like. The pixel control number and the number of scans in one frame period can be set as appropriate.

In the operation example of FIG. 14, the correction coefficient switching signal is "1" in the period between the time T1a6 and the time T1a7 and the period between the time T1a7 and the time T1a8. Therefore, the correction coefficient selection unit 182c selects the first correction coefficient in the period between the time T1a6 and the time T1a7 and the period between the time T1a7 and the time T1a8, and the correction coefficient selection unit 182c selects the second correction coefficient in the other periods. Other configurations and correction processing are the same as those in the first embodiment.

As described above, even in the driving method in which the signal A and the signal A+B are acquired as in the present embodiment, the correction can be performed by switching the correction coefficient used for the black level correction at the timing when the number of rows controlled in parallel changes, as in the first embodiment. Therefore, according to the present embodiment, a photoelectric conversion device in which noise is reduced is provided.

The correction coefficients used for correcting the signal A and the correction coefficients used for correcting the signal A+B may be different from each other. For example, the first correction coefficient for the signal A can be set to "1" and the second correction coefficient for the signal A can be set to "8", and the first correction coefficient for the signal A+B can be set to "2" and the second correction coefficient for the signal A+B can be set to "10". By using correction coefficients suitable for each of the signal A and the signal A+B, noise can be reduced more effectively.

Fifth Embodiment

A photoelectric conversion device according to a fifth embodiment will be described with reference to FIG. 15. In the present embodiment, an example of a correction method in a case where a horizontal synchronization signal of the electronic shutter scan and a horizontal synchronization signal of the readout scan are independent from each other and the electronic shutter scan and the readout scan are performed at different clock cycles will be described. In the present embodiment, description of elements common to the first to fourth embodiments may be omitted or simplified.

Figure 15:
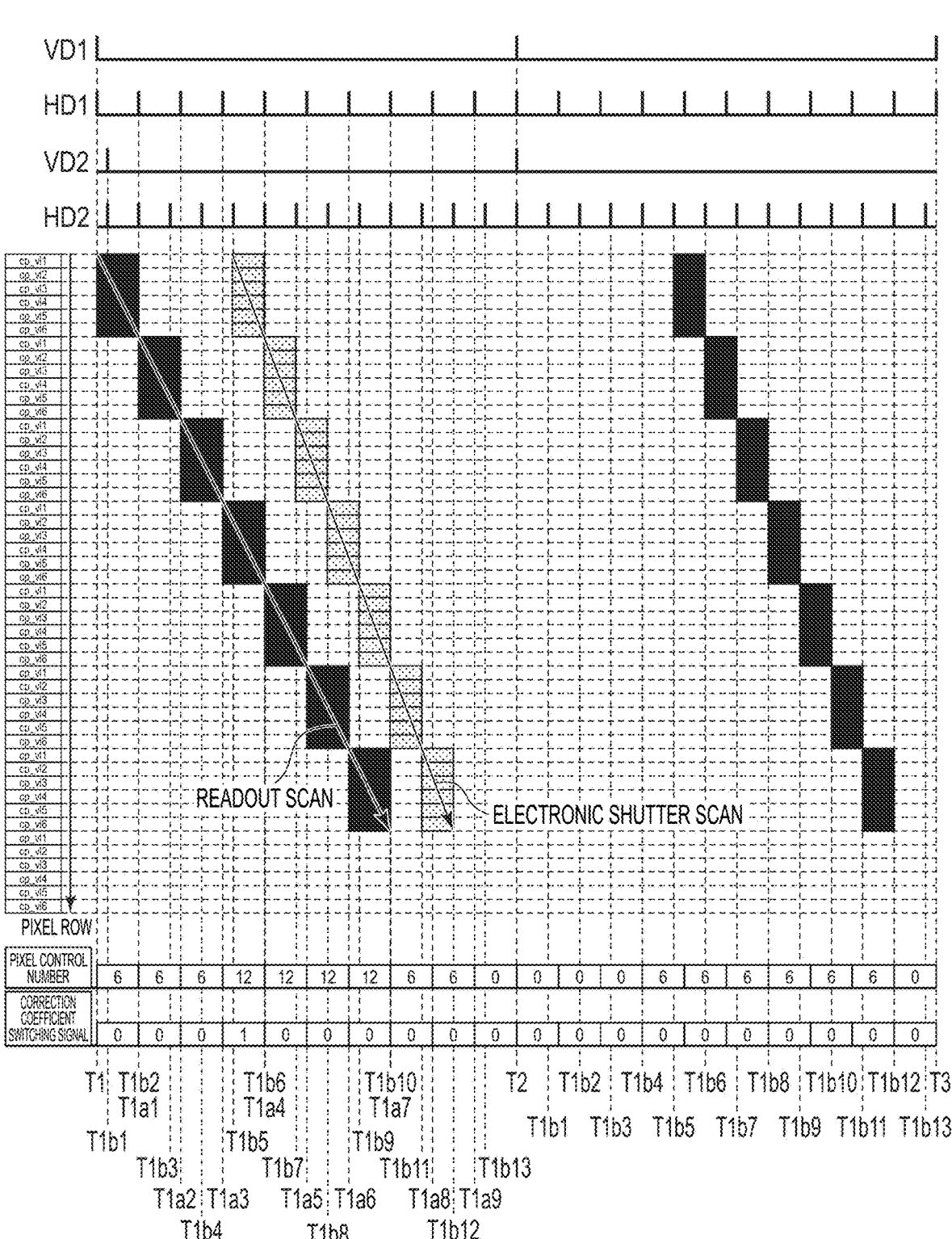
FIG. 15 is a timing chart illustrating an operation example of the photoelectric conversion device according to a fifth embodiment.

FIG. 15 is a timing chart illustrating an operation example of the photoelectric conversion device 1 according to the present embodiment. The electronic shutter scan and the readout scan in the photoelectric conversion device 1 will be described with reference to FIG. 15. In the present embodiment, in one frame period between time T1 and time T2, the readout scan is controlled by a horizontal synchronization signal HD1 having a cycle of 10 μs, and the electronic shutter scan is controlled by a horizontal synchronization signal HD2 having a cycle of 8 μs.

In one frame period between the time T1 and the time T2, one electronic shutter scan and one readout scan are performed.

At the time T1, the readout scan starts. In a period from the time T1 to the time T1$a$1, signals based on the charges accumulated in the photoelectric conversion elements PD of the pixels P arranged in six rows from the first row to the sixth row are read.

In a period from the time T1$a$1 to time T1$a$2, signals based on the charges accumulated in the photoelectric conversion elements PD of the pixels P arranged in the six row from the seventh row to the twelfth row are read. After the time T1$a$2, the readout operation is sequentially performed six rows at a time in synchronization with the horizontal synchronization signal HD1.

In the frame period (from the time T1 to the time T2), the electronic shutter scan for the reading scan in the next frame period (from the time T2 to time T3) is performed.

At time T1$b$5, the electronic shutter scan starts. In a period between the time T1$b$5 and time T1$b$6, the reset state of the photoelectric conversion elements PD of the pixels P arranged in the six rows from the first row to the sixth row is canceled. After the time T1$b$6, the electronic shutter operation is sequentially performed six rows at a time in synchronization with the horizontal synchronization signal HD2.

In one frame period between the time T2 and the time T3, the readout scan synchronized with the horizontal synchronization signal HD2 is performed.

In a period between the time T1$b$5 and time T1$a$7, the readout scan and the electronic shutter scan are performed in an overlapping manner. Therefore, as illustrated in "pixel control number" in FIG. 15, in this period, the pixel control number is increased as compared with the other periods. In the operation of the present embodiment, the pixel control number changes after time T1$a$3. As a result, the potential of the power supply or the like may fluctuate at a time near the time T1$a$3. Due to this potential fluctuation, strip-shaped noise may appear in the image.

The start times of the electronic shutter scan and the readout scan illustrated in the example of FIG. 15 may vary depending on the setting of the photoelectric conversion device 1 or the like. Therefore, the period in which the electronic shutter scan and the readout scan are performed in an overlapping manner may vary depending on the setting of the photoelectric conversion device 1 or the like. The pixel control number and the number of scans in one frame period can be set as appropriate.

In the operation example of FIG. 15, the correction coefficient switching signal is "1" during a period from the time T1$a$3 to time T1$a$4. Therefore, the correction coefficient selection unit 182$c$ selects the first correction coefficient in the period between the time T1$a$3 and the time T1$a$4, and the correction coefficient selection unit 182$c$ selects the second correction coefficient in the other periods. Other configurations and correction processing are the same as those in the first embodiment.

As described above, even in the driving method in which the horizontal synchronization signal of the electronic shutter scan and the horizontal synchronization signal of the readout scan are independent as in the present embodiment, the correction can be performed by switching the correction coefficient at the timing when the number of rows controlled in parallel changes, as in the first embodiment. Therefore, according to the present embodiment, a photoelectric conversion device in which noise is reduced is provided.

In the present embodiment, the periods of the horizontal synchronization signals HD1 and HD2 are set to be different from each other, but the horizontal synchronization signals HD1 and HD2 may have the same period. Although the horizontal synchronization signals HD1 and HD2 are set to be asynchronous in the present embodiment, they may be synchronous. Further, in the present embodiment, the period of the horizontal synchronization signal HD1 is set to 10 μs, and the period of the horizontal synchronization signal HD2 is set to 8 μs, but the lengths of the periods are not limited thereto.

Sixth Embodiment

Figure 16:
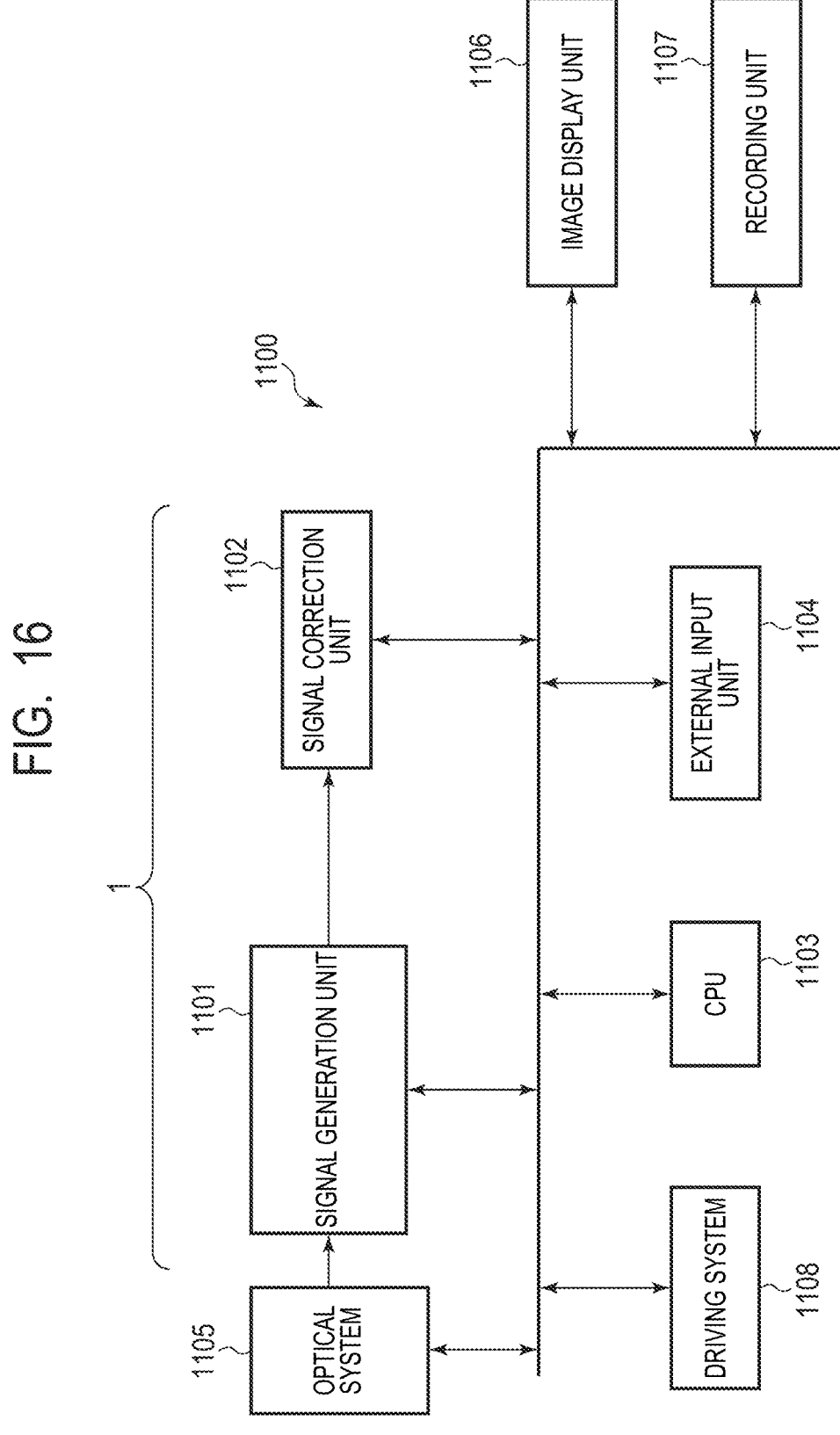
FIG. 16 is a diagram illustrating a configuration example of an imaging system according to a sixth embodiment.

FIG. 16 is a diagram illustrating a configuration example of an imaging system 1100 according to the present embodiment. The imaging system 1100 is an example of equipment in which the photoelectric conversion device 1 according to the first to fifth embodiments is incorporated. The imaging system 1100 includes a signal generation unit 1101, a signal correction unit 1102, a CPU 1103, an external input unit 1104, an optical system 1105, an image display unit 1106, a recording unit 1107, and a driving system 1108.

The signal correction unit 1102 may be the signal processing unit 18 described above. The signal generation unit 1101 may include the pixel array 11, the control unit 12, the vertical scanning unit 13, the readout circuit unit 14, the AD conversion unit 15, the memory unit 16, the horizontal scanning unit 17, and the like. Therefore, the signal generation unit 1101 and the signal correction unit 1102 may be the photoelectric conversion device 1 described above.

The optical system 1105 is a portion that causes light to enter the light receiving portion of the signal generation unit 1101, and may include a lens, an aperture, and the like. The signal generation unit 1101 photoelectrically converts incident light to generate an analog image signal. The signal generation unit 1101 performs an AD conversion on the analog signal to generate and output image data. The signal correction unit 1102 performs correction processing on the image data so that the image data can be output to and stored in the image display unit 1106 or the recording unit 1107. The image display unit 1106 displays an image using display image data subjected to the correction processing. The recording unit 1107 stores the display image data. The CPU 1103 is a processor that performs overall control of the imaging system 1100 and arithmetic processing. The driving system 1108 performs, for example, focus adjustment and adjustment of the aperture of the optical system 1105, and the like. The external input unit 1104 may be a button or the like for the user to input imaging conditions, operate a shutter, or the like. The image display unit 1106 may be a touch panel, and the touch panel may function as a part of the external input unit 1104.

According to the present embodiment, equipment in which the photoelectric conversion device 1 according to the first to fifth embodiments is incorporated is provided.

Seventh Embodiment

Figure 17:
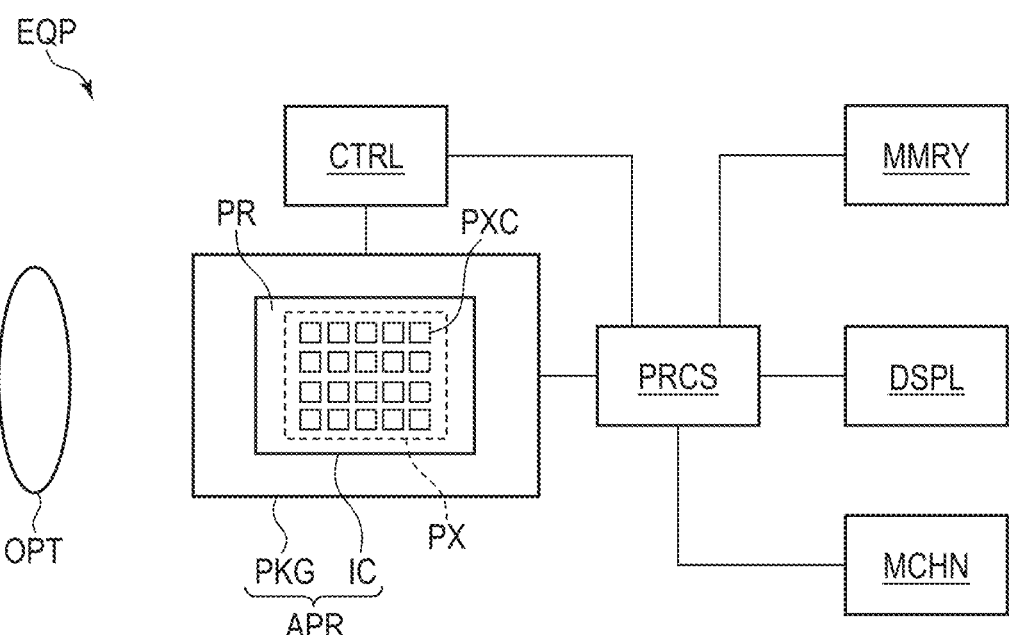
FIG. 17 is a block diagram illustrating a schematic configuration of equipment according to a seventh embodiment.

Equipment according to a seventh embodiment of the present invention will be described with reference to FIG. 17. FIG. 17 is a block diagram illustrating a schematic configuration of equipment according to the present embodiment.

FIG. 17 is a schematic diagram illustrating equipment EQP including a photoelectric conversion device APR. The photoelectric conversion device APR has the function of the photoelectric conversion device 1 according to the first to fifth embodiments. All or part of the photoelectric conversion device APR is a semiconductor device IC. The photoelectric conversion device APR of this example can be used as, for example, an image sensor, an auto focus (AF) sensor, a photometric sensor, a ranging sensor, or the like. The semiconductor device IC has a pixel area PX in which pixel circuits PXC each including photoelectric conversion unit are arranged in a matrix. The semiconductor device IC may have a peripheral area PR around the pixel area PX. Circuits other than the pixel circuits can be arranged in the peripheral area PR.

The photoelectric conversion device APR may have a structure (stacked chips structure) in which a first semiconductor chip provided with a plurality of photoelectric conversion units and a second semiconductor chip provided with a peripheral circuit are stacked. Each of the peripheral circuits in the second semiconductor chip may be a column circuit corresponding to a pixel column of the first semiconductor chip. Each of the peripheral circuits in the second semiconductor chip may be a matrix circuit corresponding to a pixel or a pixel block in the first semiconductor chip. For the connection between the first semiconductor chip and the second semiconductor chip, a through electrode (TSV), an inter-chip wiring by direct bonding of a conductor such as copper, a connection by a micro bump between chips, a connection by wire bonding, or the like can be employed.

The photoelectric conversion device APR may include a package PKG for mounting the semiconductor device IC in addition to the semiconductor device IC. The package PKG may include a base body to which the semiconductor device IC is fixed, a lid such as glass facing the semiconductor device IC, and a connection member such as a bonding wire or a bump for connecting a terminal provided on the base body and a terminal provided on the semiconductor device IC.

The equipment EQP may further include at least one of an optical device OPT, a control device CTRL, a processing device PRCS, a display device DSPL, a storage device MMRY, and a mechanical device MCHN. The optical device OPT corresponds to the photoelectric conversion device APR as a photoelectric conversion device, and is, for example, a lens, a shutter, or a mirror. The control device CTRL controls the photoelectric conversion device APR, and is, for example, a semiconductor device such as an ASIC. The processing device PRCS processes a signal output from the photoelectric conversion device APR, and constitutes an analog front end (AFE) or a digital front end (DFE). The processing device PRCS is a semiconductor device such as a central processing unit (CPU) or an application specific integrated circuit (ASIC). The display device DSPL is an EL display device, a liquid crystal display device, or the like that displays information (image) obtained by the photoelectric conversion device APR. The storage device MMRY is a magnetic device, a semiconductor device, or the like that stores information (image) obtained by the photoelectric conversion device APR. The storage device MMRY is a volatile memory such as an SRAM or a DRAM, or a nonvolatile memory such as a flash memory or a hard disk drive. The mechanical device MCHN includes a movable portion or a propulsion portion such as a motor or an engine. In the equipment EQP, a signal output from the photoelectric conversion device APR is displayed on the display device DSPL or transmitted to the outside by a communication device (not illustrated) included in the equipment EQP. Therefore, it is preferable that the equipment EQP further include a storage device MMRY and a processing device PRCS separately from the storage circuit unit and the arithmetic circuit unit included in the photoelectric conversion device APR.

The equipment EQP illustrated in FIG. 17 may be an electronic device such as an information terminal (for example, a smartphone and a wearable terminal) having a photographing function, a camera (For example, an interchangeable lens camera, a compact camera, a video camera, and a surveillance camera), or the like. The mechanical device MCHN in the camera may drive parts of the optical device OPT for zooming, focusing, and shutter operation. Also, the equipment EQP may be a transport device (movable body) such as a vehicle, a ship, or a flying object. The equipment EQP may be a medical device such as an endoscope or a CT scanner.

The mechanical device MCHN in the transport device may be used as a movable device. The equipment EQP as a transport device is suitable for transporting the photoelectric conversion device APR, or for assisting and/or automating driving (manipulation) by an imaging function. The processing device PRCS for assisting and/or automating driving (manipulation) may perform processing for operating the mechanical device MCHN as a movable device based on information obtained by the photoelectric conversion device APR.

The photoelectric conversion device APR according to the present embodiment may provide a high value to a designer, a manufacturer, a seller, a purchaser, and/or a user thereof. Therefore, when the photoelectric conversion device APR is mounted on the equipment EQP, the value of the equipment EQP may also be increased. Therefore, in manufacturing and selling the equipment EQP, it is advantageous to determine the mounting of the photoelectric conversion device APR of the present embodiment on the equipment EQP in order to increase the value of the equipment EQP.

Eighth Embodiment

FIGS. 18A and 18B are block diagrams of equipment relating to the vehicle-mounted camera according to the present embodiment. FIGS. 18A and 18B illustrate an example in which the photoelectric conversion device 1 is applied to a movable body such as a vehicle. The equipment 80 includes an imaging device 800 (an example of the photoelectric conversion device) and a signal processing device (processing device) that processes a signal from the imaging device 800. The equipment 80 includes an image processing unit 801 that performs image processing on a plurality of pieces of image data acquired by the imaging device 800, and a parallax calculation unit 802 that calculates parallax (phase difference of parallax images) from the plurality of pieces of image data acquired by the equipment 80. The equipment 80 includes a distance measurement unit 803 that calculates a distance to an object based on the calculated parallax, and a collision determination unit 804 that determines whether or not there is a possibility of collision based on the calculated distance. Here, the parallax calculation unit 802 and the distance measurement unit 803 are examples of a distance information acquisition unit that acquires distance information to the object. That is, the distance information is information on a parallax, a defocus amount, a distance to the object, and the like. The collision determination unit 804 may determine the possibility of collision using any of these pieces of distance information. The distance information acquisition unit may be realized by dedicatedly designed hardware or software modules. Further, it may be realized by a field programmable gate array (FPGA), an application specific integrated circuit (ASIC) or a combination thereof.

The equipment 80 is connected to the vehicle information acquisition device 810, and can obtain vehicle information such as a vehicle speed, a yaw rate, and a steering angle. Further, the equipment 80 is connected to a control ECU 820 which is a control device that outputs a control signal for generating a braking force to the vehicle based on the determination result of the collision determination unit 804. The equipment 80 is also connected to an alert device 830 that issues an alert to the driver based on the determination result of the collision determination unit 804. For example, when the collision possibility is high as the determination result of the collision determination unit 804, the control ECU 820 performs vehicle control to avoid collision or reduce damage by braking, returning an accelerator, suppressing engine output, or the like. The alert device 830 alerts the user by sounding an alarm such as a sound, displaying alert information on a screen of a car navigation system or the like, or giving vibration to a seat belt or a steering wheel. The equipment 80 functions as a control unit that controls the operation of controlling the vehicle as described above.

In the present embodiment, an image of the periphery of the vehicle, for example, the front or the rear is captured by the equipment 80. FIG. 18B illustrates equipment in a case where an image is captured in front of the vehicle (image capturing range 850). The vehicle information acquisition device 810 as the imaging control unit sends an instruction to the equipment 80 or the imaging device 800 to perform the imaging operation. With such a configuration, the accuracy of distance measurement can be further improved.

Although the example of control for avoiding a collision to another vehicle has been described above, the embodiment is applicable to automatic driving control for following another vehicle, automatic driving control for not going out of a traffic lane, or the like. Furthermore, the equipment is not limited to a vehicle such as an automobile and can be applied to a movable body (movable apparatus) such as a ship, an airplane, a satellite, an industrial robot and a consumer use robot, or the like, for example. In addition, the equipment can be widely applied to equipment which utilizes object recognition or biometric authentication, such as an intelligent transportation system (ITS), a surveillance system, or the like without being limited to movable bodies.

Modified Embodiments

The present invention is not limited to the above embodiments, and various modifications are possible. For example, an example in which some of the configurations of any one of the embodiments are added to other embodiments or an example in which some of the configurations of any one of the embodiments are replaced with some of the configurations of other embodiments are also embodiments of the present invention.

The disclosure of this specification includes a complementary set of the concepts described in this specification. That is, for example, if a description of "A is B" (A=B) is provided in this specification, this specification is intended to disclose or suggest that "A is not B" even if a description of "A is not B" (A≠B) is omitted. This is because it is assumed that "A is not B" is considered when "A is B" is described.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-203247, filed Nov. 30, 2023, which is hereby incorporated by reference herein in its entirety.

What is claimed is:

1. A photoelectric conversion device comprising:
   a pixel array including a plurality of pixels arranged to form a plurality of rows;
   a pixel control unit configured to control the plurality of pixels on a row basis; and
   a correction value generation unit configured to generate a correction value to be used for black level correction of a signal output from the pixel array,
   wherein the pixel array includes an effective pixel region that outputs a signal according to incident light by photoelectric conversion and a correction signal acquisition region that outputs a correction signal for the black level correction,
   wherein the correction signal acquisition region is arranged so as to correspond to each row of the effective pixel region,
   wherein the pixel control unit is configured to control pixels of two or more rows in parallel in one row control period, and is configured to change the number of control rows in which the pixels are controlled in parallel in one frame period, and
   wherein the correction value generation unit generates the correction value using a first correction coefficient in a predetermined number of row control periods including a timing at which the number of control rows changes, and generates the correction value using a second correction coefficient in other row control periods.

2. The photoelectric conversion device according to claim 1, wherein the pixel control unit performs a first control to cancel a reset state of charge accumulation in the pixel.

3. The photoelectric conversion device according to claim 1, wherein the pixel control unit performs a second control to output a signal based on charges accumulated in the pixel.

4. The photoelectric conversion device according to claim 3,
    wherein the pixel control unit performs a plurality of second controls in parallel, and
    wherein the plurality of second controls overlap at a timing when the number of control rows changes.

5. The photoelectric conversion device according to claim 4, wherein the number of control rows is a sum of the number of rows in which the plurality of second controls are performed in parallel.

6. The photoelectric conversion device according to claim 1,
    wherein the pixel control unit performs a first control to cancel a reset state of charge accumulation in the pixel and a second control to output a signal based on charges accumulated in the pixel, and
    wherein the first control and the second control overlap each other at a timing when the number of control rows changes.

7. The photoelectric conversion device according to claim 6, wherein the number of control rows is a sum of the number of rows in which the first control and the second control are performed in parallel.

8. The photoelectric conversion device according to claim 6, wherein a timing of the first control and a timing of the second control are controlled by different synchronization signals.

9. The photoelectric conversion device according to claim 8, wherein the different synchronization signals have different periods.

10. The photoelectric conversion device according to claim 1, wherein each of the plurality of pixels includes a first photoelectric conversion element and a second photoelectric conversion element.

11. The photoelectric conversion device according to claim 10, wherein each of the plurality of pixels outputs a signal corresponding to incident light to the first photoelectric conversion element and a signal corresponding to incident light to the first photoelectric conversion element and the second photoelectric conversion element.

12. The photoelectric conversion device according to claim 1, wherein the correction value generation unit includes a low-pass filter.

13. The photoelectric conversion device according to claim 12, wherein the first correction coefficient and the second correction coefficient are attenuation coefficients of the low-pass filter.

14. The photoelectric conversion device according to claim 13, wherein the first correction coefficient is greater than the second correction coefficient.

15. The photoelectric conversion device according to claim 12, wherein the low-pass filter is an infinite impulse response (IIR) filter.

16. The photoelectric conversion device according to claim 1,
    wherein a pixel in the effective pixel region includes a photoelectric conversion element, and
    wherein a pixel in the correction signal acquisition region includes a photoelectric conversion element and a light shielding portion that shields incident light to the photoelectric conversion element.

17. The photoelectric conversion device according to claim 1,
    wherein a pixel in the effective pixel region includes a photoelectric conversion element, and
    wherein a pixel in the correction signal acquisition region does not include a photoelectric conversion element.

18. Equipment comprising:
    the photoelectric conversion device according to claim 1; and
    at least any one of:
        an optical device adapted for the photoelectric conversion device,
        a control device configured to control the photoelectric conversion device,
        a processing device configured to process a signal output from the photoelectric conversion device,
        a display device configured to display information obtained by the photoelectric conversion device,
        a storage device configured to store information obtained by the photoelectric conversion device, and
        a mechanical device configured to operate based on information obtained by the photoelectric conversion device.

19. The equipment according to claim 18, wherein the processing device acquires distance information on a distance from the photoelectric conversion device to an object.

20. A signal processing device comprising:
    a correction value generation unit configured to generate a correction value; and
    a correction unit configured to perform black level correction of a signal output from a pixel array based on the correction value,
    wherein the signal processing device is configured to process a signal output from a photoelectric conversion device,
    wherein the photoelectric conversion device including the pixel array including a plurality of pixels arranged to form a plurality of rows, and a pixel control unit configured to control the plurality of pixels on a row basis,
    wherein the pixel array includes an effective pixel region that outputs a signal according to incident light by photoelectric conversion and a correction signal acquisition region that outputs a correction signal for the black level correction,
    wherein the correction signal acquisition region is arranged so as to correspond to each row of the effective pixel region,
    wherein the pixel control unit is configured to control pixels of two or more rows in parallel in one row control period, and is configured to change the number of control rows in which the pixels are controlled in parallel in one frame period, and
    wherein the correction value generation unit generates the correction value using a first correction coefficient in a predetermined number of row control periods including a timing at which the number of control rows changes, and generates the correction value using a second correction coefficient in other row control periods.

* * * * *